(12) United States Patent
Ma et al.

(10) Patent No.: US 11,219,899 B2
(45) Date of Patent: Jan. 11, 2022

(54) MICRO-CHANNEL STRUCTURE, SENSOR, MICRO-FLUIDIC DEVICE, LAB-ON-CHIP DEVICE, AND METHOD OF FABRICATING MICRO-CHANNEL STRUCTURE

(71) Applicant: BOE Technology Group Co., Ltd., Beijing (CN)

(72) Inventors: Xiaochen Ma, Beijing (CN); Guangcai Yuan, Beijing (CN); Ce Ning, Beijing (CN); Song Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 375 days.

(21) Appl. No.: 16/475,035

(22) PCT Filed: Aug. 1, 2018

(86) PCT No.: PCT/CN2018/098071
§ 371 (c)(1),
(2) Date: Jun. 28, 2019

(87) PCT Pub. No.: WO2020/024159
PCT Pub. Date: Feb. 6, 2020

(65) Prior Publication Data
US 2021/0331167 A1     Oct. 28, 2021

(51) Int. Cl.
*B60L 3/00* (2019.01)
*G01N 27/414* (2006.01)
*B01L 3/00* (2006.01)

(52) U.S. Cl.
CPC ... *B01L 3/502761* (2013.01); *B01L 3/502707* (2013.01); *B01L 3/502753* (2013.01);
(Continued)

(58) Field of Classification Search
CPC ......... B01L 3/502761; B01L 3/502707; B01L 3/502753; B01L 2300/0645;
(Continued)

(56) References Cited

U.S. PATENT DOCUMENTS

| 2015/0219589 A1 | 8/2015 | Generelli et al. |
| 2017/0016930 A1 | 1/2017 | Qiu et al. |

FOREIGN PATENT DOCUMENTS

| CN | 102242062 A | 11/2011 |
| CN | 103203258 A | 7/2013 |

(Continued)

OTHER PUBLICATIONS

First Office Action in the Chinese Patent Application No. 201880000933.7, dated Apr. 20, 2021; English translation attached.
(Continued)

*Primary Examiner* — Jennifer Wecker
(74) *Attorney, Agent, or Firm* — Intellectual Valley Law, P.C.

(57) ABSTRACT

The present application provides a micro-channel structure. The micro-channel structure includes a base substrate; a rail layer on the base substrate and including a first rail and a second rail spaced apart from each other; and a wall layer on a side of the rail layer distal to the base substrate, and including a first wall and a second wall at least partially spaced apart from each other, thereby forming a micro-channel between the first wall and the second wall. The micro-channel has an extension direction along a plane substantially parallel to a main surface of the base substrate, the extension direction being substantially parallel to extension directions of the first rail and the second rail along the plane substantially parallel to the main surface of the base substrate.

18 Claims, 16 Drawing Sheets

(52) U.S. Cl.
CPC .... *G01N 27/414* (2013.01); *B01L 2200/0631* (2013.01); *B01L 2200/10* (2013.01); *B01L 2200/12* (2013.01); *B01L 2300/06* (2013.01); *B01L 2300/0645* (2013.01); *B01L 2300/0816* (2013.01); *B01L 2300/0858* (2013.01); *B01L 2300/16* (2013.01)

(58) Field of Classification Search
CPC ..... B01L 2300/0858; B01L 2200/0631; B01L 2300/16; B01L 2300/0816; B01L 2200/10; B01L 2300/06; B01L 2200/12; G01N 27/414
See application file for complete search history.

(56) References Cited

FOREIGN PATENT DOCUMENTS

| CN | 103226127 A | | 7/2013 |
|---|---|---|---|
| CN | 203445122 U | * | 2/2014 |
| CN | 203445122 U | | 2/2014 |
| CN | 204228613 U | | 3/2015 |
| CN | 105070720 A | | 11/2015 |
| CN | 106591105 A | | 4/2017 |
| DE | 10157317 A1 | | 6/2003 |
| WO | 2014027051 A1 | | 2/2014 |

OTHER PUBLICATIONS

International Search Report & Written Opinion dated Apr. 28, 2019, regarding PCT/CN2018/098071.
Lam, Ernest T., et al. "Genome mapping on nanochannel arrays for structural variation analysis and sequence assembly." Nature biotechnology 30.8 (2012): 771-776.
Li, Xiaoxuan, et al. "Fabrication and characterization of nanofluidics device using fused silica for single protein molecule detection." (2007) Book.
Choopun, Supab, et al. "Metal-Oxide Nanowires for Gas Sensors", in "Nanowires—Recent Advances", book edited by Xihong Peng, ISBN 978-953-51-0898-6, Published: Dec. 19, 2012.
Xu, Lei, et al. "Micro/Nano Gas Sensors: A New Strategy Towards In-Situ Wafer-Level Fabrication of High-Performance Gas Sensing Chips", Scientific Reports, 5:10507, Published May 22, 2015.
Xu, Shipu, et al. "Fabrication of SnO2-Reduced Graphite Oxide Monolayer-Ordered Porous Film Gas Sensor with Tunable Sensitivity through Ultra-Violet Light Irradiation", Scientific Reports, 5:8939, Published Mar. 11, 2015.

* cited by examiner

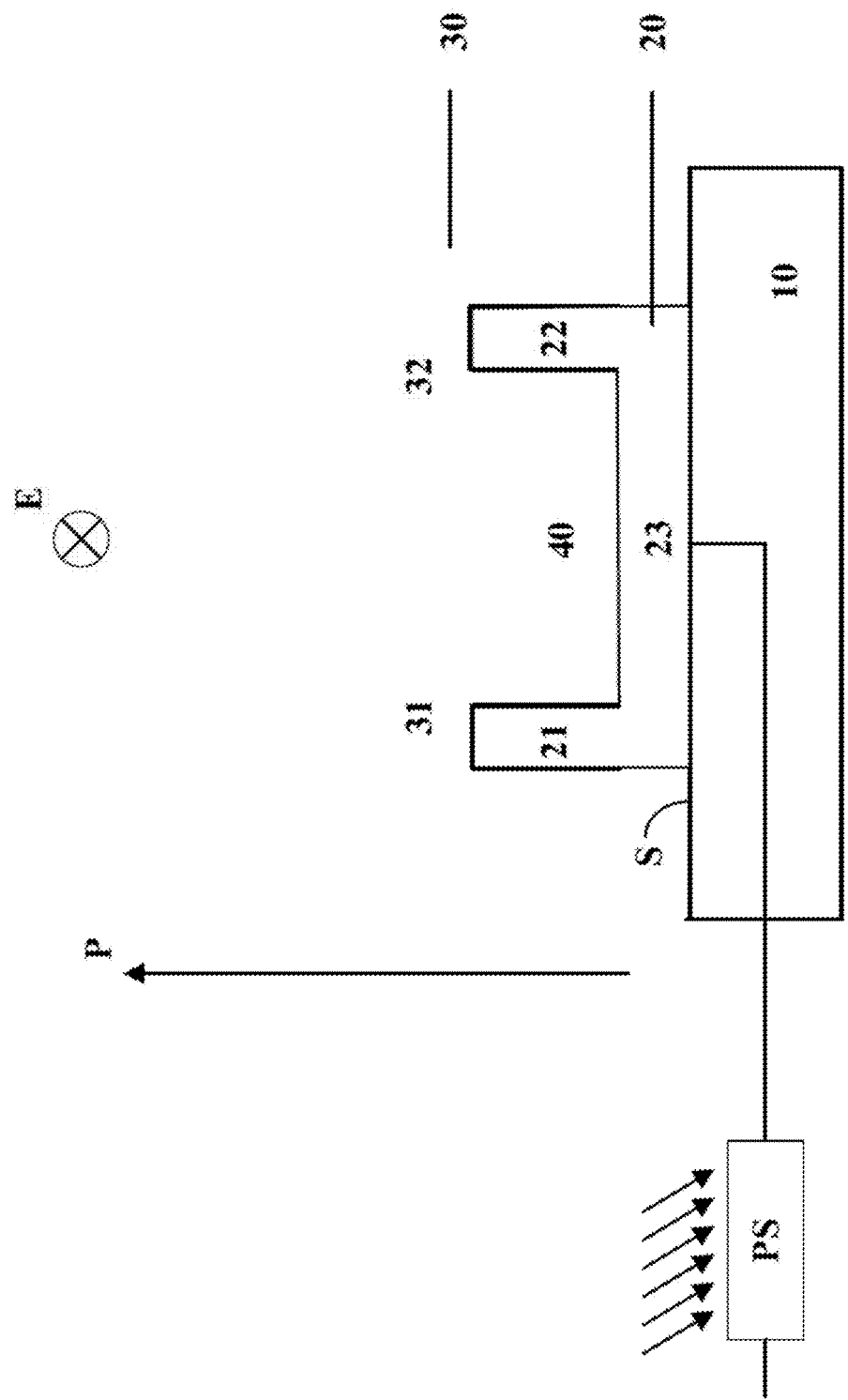

```
┌─────────────────────────────────────────────┐
│     forming a rail layer on a base substrate │
└─────────────────────────────────────────────┘
                        │
                        ▼
┌─────────────────────────────────────────────────────────┐
│ subsequent to forming the rail layer, forming a wall layer on a │
│         side of the rail layer distal to the base substrate;    │
│   wherein forming the rail layer comprises forming a first rail │
│          and a second rail spaced apart from each other;        │
│    forming the wall layer comprises forming a first wall and a  │
│   second wall spaced apart from each other, thereby forming a   │
│   micro-channel between the first wall and the second wall; and │
│    the micro-channel is formed to have an extension direction   │
│     along a plane substantially parallel to a main surface of the │
│      base substrate, the extension direction being substantially  │
│  parallel to extension directions of the first rail and the second │
│    rail along the plane substantially parallel to the main surface │
│                      of the base substrate.                     │
└─────────────────────────────────────────────────────────┘
```

FIG. 10

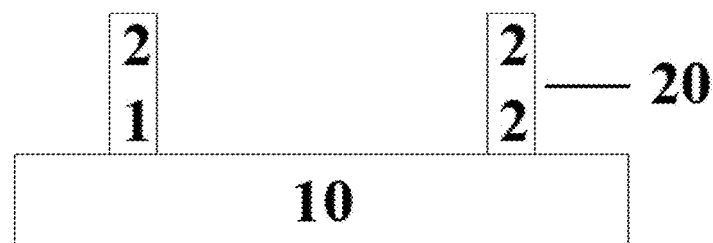
FIG. 11A
FIG. 11B
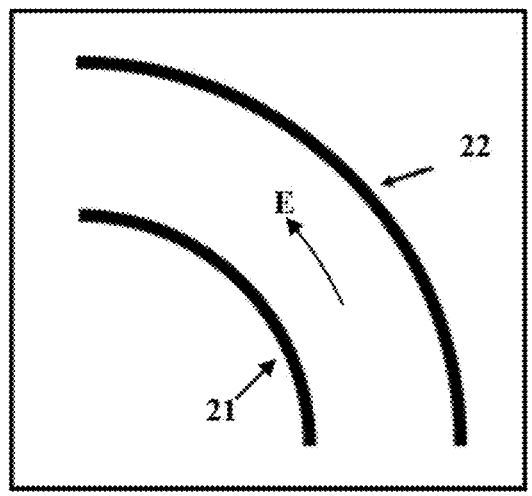
FIG. 11C
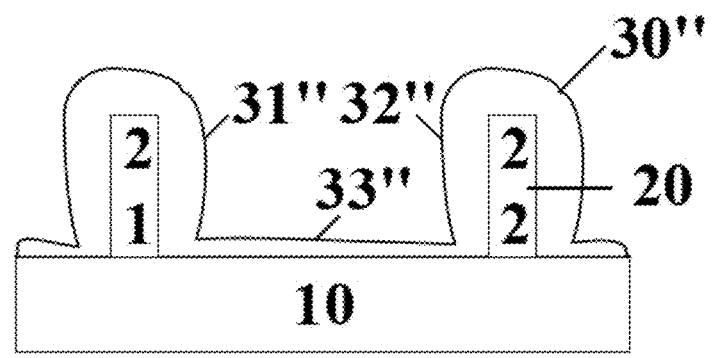
FIG. 11D

MICRO-CHANNEL STRUCTURE, SENSOR, MICRO-FLUIDIC DEVICE, LAB-ON-CHIP DEVICE, AND METHOD OF FABRICATING MICRO-CHANNEL STRUCTURE

CROSS-REFERENCE TO RELATED APPLICATION

This application is a national stage application under 35 U.S.C. § 371 of International Application No. PCT/CN2018/098071, filed Aug. 1, 2018, the contents of which are incorporated by reference in the entirety.

TECHNICAL FIELD

The present invention relates to micro-fluidic technology, more particularly, to a micro-channel structure, a sensor, a micro-fluidic device, a lab-on-chip device, and a method of fabricating a micro-channel structure.

BACKGROUND

Microfluidics deals with the behavior, precise control and manipulation of fluids that are geometrically constrained to a small, typically sub-millimeter, scale. It is a multidisciplinary field at the intersection of engineering, physics, chemistry, biochemistry, nanotechnology, and biotechnology, with practical applications in the design of systems in which low volumes of fluids are processed to achieve multiplexing, automation, and high-throughput screening. Microfluidics emerged in the beginning of the 1980s and is used in the development of inkjet printheads, DNA chips, lab-on-a-chip technology, micro-propulsion, and micro-thermal technologies.

SUMMARY

In one aspect, the present invention provides a micro-channel structure, comprising a base substrate; a rail layer on the base substrate and comprising a first rail and a second rail spaced apart from each other; and a wall layer on a side of the rail layer distal to the base substrate, and comprising a first wall and a second wall at least partially spaced apart from each other, thereby forming a micro-channel between the first wall and the second wall; wherein the micro-channel has an extension direction along a plane substantially parallel to a main surface of the base substrate, the extension direction being substantially parallel to extension directions of the first rail and the second rail along the plane substantially parallel to the main surface of the base substrate.

Optionally, an orthographic projection of the first wall on the base substrate substantially covers an orthographic projection of the first rail on the base substrate; and an orthographic projection of the second wall on the base substrate substantially covers an orthographic projection of the second rail on the base substrate.

Optionally, the first wall protrudes away from a side of the first rail distal to the base substrate along a protrusion direction and the second wall protrudes away from a side of the second rail distal to the base substrate along the protrusion direction; and the first wall and the second wall are completely spaced apart from each other along the protrusion direction in at least a portion of the wall layer thereby forming the micro-channel that is at least partially open on a side opposite to the base substrate.

Optionally, the first wall protrudes away from a side of the first rail distal to the base substrate along a protrusion direction and the second wall protrudes away from a side of the second rail distal to the base substrate along the protrusion direction; and the first wall and the second wall are connected to each other in a first region of the wall layer and are spaced apart from each other in a second region of the wall layer thereby forming the micro-channel that is substantially closed on a side opposite to the base substrate, the first region on a side of the second region distal to the base substrate along the protrusion direction.

Optionally, the wall layer further comprises a third wall connecting the first rail and the second rail; and the third wall is in direct contact with the base substrate.

Optionally, the rail layer further comprises a base connecting the first rail and the second rail; a cross-section along a plane substantially perpendicular to the extension directions of the first rail and the second rail has a U shape.

Optionally, the first rail and the second rail comprise a conductive material.

Optionally, the rail layer comprises a material different from a material of the wall layer.

In another aspect, the present invention provides a multi-layer micro-channel structure, comprising a first layer of the multi-layer micro-channel structure and a second layer of the multi-layer micro-channel structure; wherein the first layer of the multi-layer micro-channel structure comprises a base substrate; a rail layer on the base substrate and comprising a first rail and a second rail spaced apart from each other; and a wall layer on a side of the rail layer distal to the base substrate, and comprising a first wall and a second wall at least partially spaced apart from each other, thereby forming a micro-channel between the first wall and the second wall; wherein the micro-channel has an extension direction along a plane substantially parallel to a main surface of the base substrate, the extension direction being substantially parallel to extension directions of the first rail and the second rail along the plane substantially parallel to the main surface of the base substrate; wherein the second layer of the multi-layer micro-channel structure comprises a second base substrate; a second rail layer on the second base substrate and comprising a third rail and a fourth rail spaced apart from each other, and a second wall layer on a side of the second rail layer distal to the second base substrate, and comprising a fourth wall and a fifth wall at least partially spaced apart from each other, thereby forming a second micro-channel between the fourth wall and the fifth wall; wherein the second micro-channel has a second extension direction along a plane substantially parallel to a main surface of the second base substrate, the second extension direction being substantially parallel to extension directions of the third rail and the fourth rail along the plane substantially parallel to the main surface of the second base substrate.

In another aspect, the present invention provides a micro-fluidic system, comprising the micro-channel structure described herein or fabricated by a method described herein.

Optionally, the micro-fluidic system further includes a sensing circuit; wherein the rail layer constitutes one or more sensing electrodes.

Optionally, the rail layer constitutes a control electrode for controlling transport of a substance in the micro-channel.

Optionally, the first rail and the second rail constitute two separate electrodes of the micro-fluidic system, and are configured to control transport of a substance through the micro-channel.

Optionally, the micro-fluidic system comprises an ionic transistor; wherein the rail layer constitutes a gate electrode of the ionic transistor.

Optionally, the rail layer further comprises a base connecting the first rail and the second rail; and a cross-section along a plane substantially perpendicular to the extension directions of the first rail and the second rail has a U shape.

In another aspect, the present invention provides a method of fabricating a micro-channel structure, comprising forming a rail layer on a base substrate; and subsequent to forming the rail layer, forming a wall layer on a side of the rail layer distal to the base substrate; wherein forming the rail layer comprises forming a first rail and a second rail spaced apart from each other; forming the wall layer comprises forming a first wall and a second wall spaced apart from each other, thereby forming a micro-channel between the first wall and the second wall; and the micro-channel is formed to have an extension direction along a plane substantially parallel to a main surface of the base substrate, the extension direction being substantially parallel to extension directions of the first rail and the second rail along the plane substantially parallel to the main surface of the base substrate.

Optionally, forming the wall layer comprises sputtering a wall layer material on a base substrate having the first rail and the second rail formed thereon.

Optionally, the method further comprises controlling a dimension and shape of the micro-channel by controlling a duration or a power of sputtering the wall layer material.

Optionally, the duration or the power is controlled in a range such that the first wall and the second wall are formed at least partially separated from each other on a side of the micro-channel opposite to the base substrate; and the micro-channel is formed to be at least partially open on a side opposite to the base substrate.

Optionally, the duration or the power is controlled in a range such that the first wall and the second wall are formed to be connected to each other on a side of the micro-channel opposite to the base substrate; and the micro-channel is formed to be substantially closed on a side opposite to the base substrate.

Optionally, sputtering the wall layer material is performed at room temperature, in a sputtering atmosphere comprising oxygen and argon, using a sputtering power of approximately 5 kW, under a sputtering atmosphere pressure of approximately 0.2 Pa.

Optionally, forming the wall layer further comprises forming a third wall connecting the first rail and the second rail; and the third wall is formed to be in direct contact with the base substrate.

In another aspect, the present invention provides a method of fabricating a sensor chip, comprising forming a micro-channel structure according to the method described herein; and forming an electrode structure of the sensor chip on a base substrate.

Optionally, the first rail and the second rail are formed using an electrode material; and the first rail and the second rail are formed as two sensor electrodes of the sensor chip.

BRIEF DESCRIPTION OF THE FIGURES

The following drawings are merely examples for illustrative purposes according to various disclosed embodiments and are not intended to limit the scope of the present invention.

FIGS. 7A and 7B are schematic diagrams of micro-fluidic devices in some embodiments according to the present disclosure.

FIG. 10 is a flow chart illustrating a method of fabricating a micro-channel structure in some embodiments according to the present disclosure.

FIGS. 11A to 11F illustrate a process of fabricating a micro-channel structure in some embodiments according to the present disclosure.

DETAILED DESCRIPTION

Figure 1:
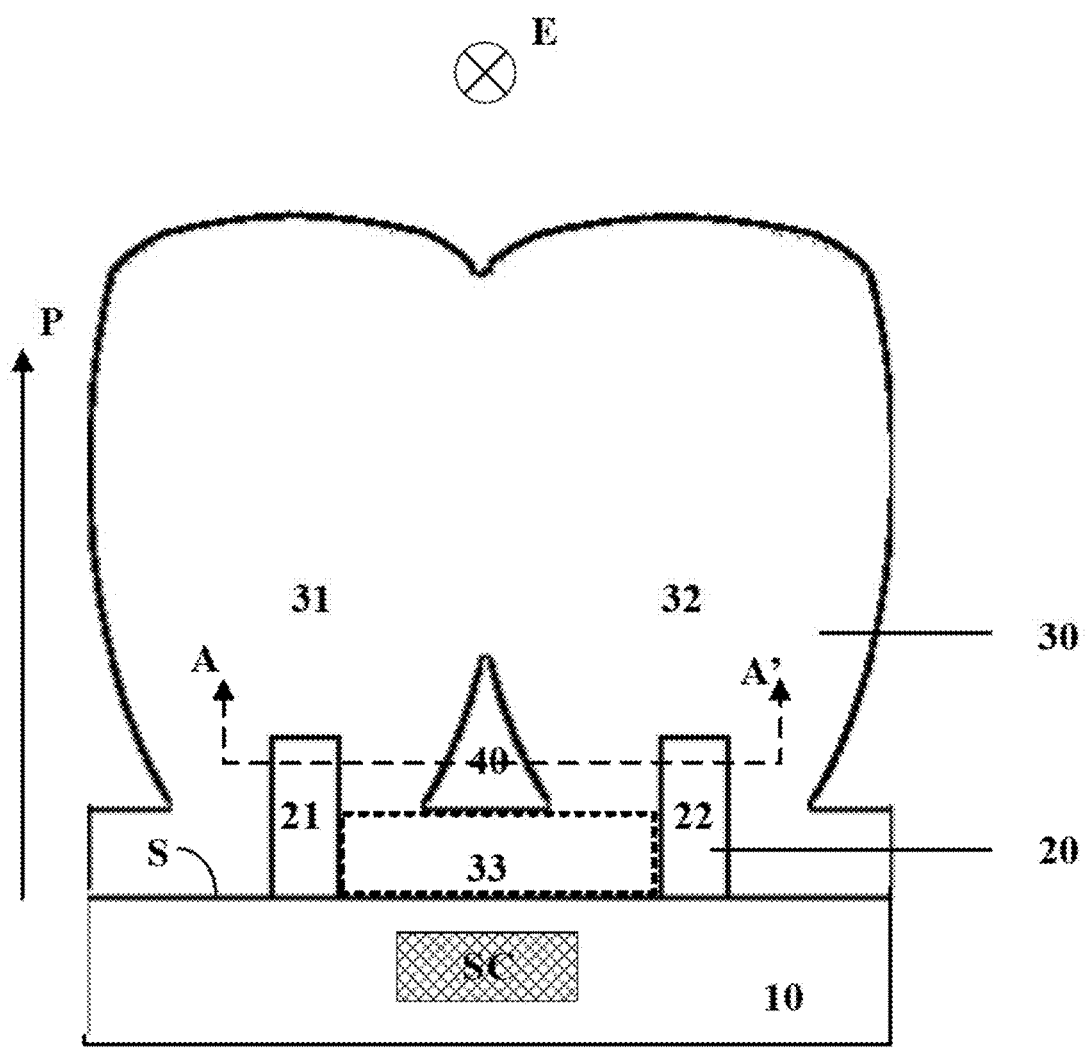
FIG. 1 is a cross-sectional view of a micro-channel structure in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional methods for fabricating micro-channel structures involve complicated and expensive processes such as electron beam lithography and laser interference etching, followed by various subsequent etching, lifting, and assembling processes. The conventional methods are associated with high manufacturing costs, low efficiency, and low scalability. Moreover, fabrication of high-resolution or ultra-high-resolution micro-channels using the conventional methods remains difficult.

Accordingly, the present disclosure provides, inter alia, a micro-channel structure, a sensor, a micro-fluidic device, a lab-on-chip device, and a method of fabricating a micro-channel structure that substantially obviate one or more of the problems due to limitations and disadvantages of the related art. In one aspect, the present disclosure provides a micro-channel structure. In some embodiments, the micro-channel structure includes a base substrate; a rail layer on the base substrate and comprising a first rail and a second rail spaced apart from each other; and a wall layer on a side of the rail layer distal to the base substrate, and comprising a first wall and a second wall spaced apart from each other, thereby forming a micro-channel between the first wall and the second wall. Optionally, the micro-channel has an extension direction along a plane substantially parallel to a main surface of the base substrate, the extension direction being substantially parallel to extension directions of the first rail and the second rail along the plane substantially parallel to the main surface of the base substrate.

As used herein, the term "micro-channel" refers to channels having cross-sectional dimensions in the range of approximately 1 nm to approximately 1000 μm, e.g., approximately 1 nm to approximately 50 nm, approximately 50 nm to approximately 100 nm, approximately 100 nm to approximately 1 μm, approximately 1 μm to approximately 10 μm, approximately 10 μm to approximately 100 μm, approximately 100 μm to approximately 200 μm, approximately 200 μm to approximately 400 μm, approximately 400 μm to approximately 600 μm, approximately 600 μm to approximately 800 μm, and approximately 800 μm to approximately 1000 μm. The term "cross-sectional dimension" may relate to height, width and in principle also to diameter. When a wall (including bottom or top of the channel) of the channel is irregular or curved, the tens "height" and "width" may also relate to mean height and mean width, respectively. A micro-channel may have any selected cross-sectional shape, for example, U-shaped, D-shaped, rectangular, triangular, elliptical, oval, circular, semi-circular, square, trapezoidal, pentagonal, hexagonal, etc. cross-sectional geometries. Optionally, the micro-channel has an irregular cross-sectional shape. The geometry may be constant or may vary along the length of the micro channel. Further, a micro-channel may have any selected arrangement or configuration, including linear, non-linear, merging, branching, looped, twisting, stepped, etc. configurations. Optionally, the micro-channel may have one or more open ends. Optionally, the micro-channel may have one or more closed ends. Optionally, the micro-channel has a closed-wall structure. Optionally, the micro-channel has a partially open-wall structure. Optionally, the micro-channel has a fully open-wall structure, e.g., a micro-groove.

Figure 2A:
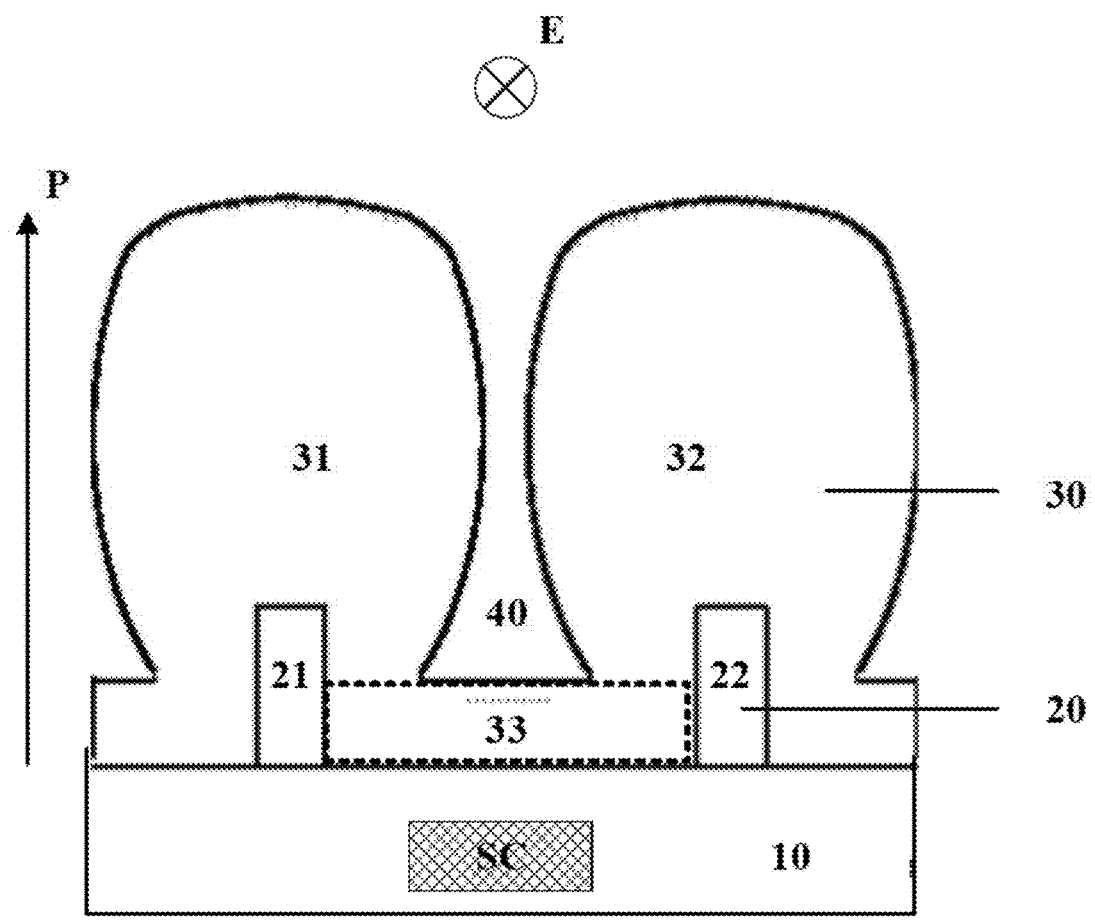
FIG. 2A is a cross-sectional view of a micro-channel structure in some embodiments according to the present disclosure.
Figure 2B:
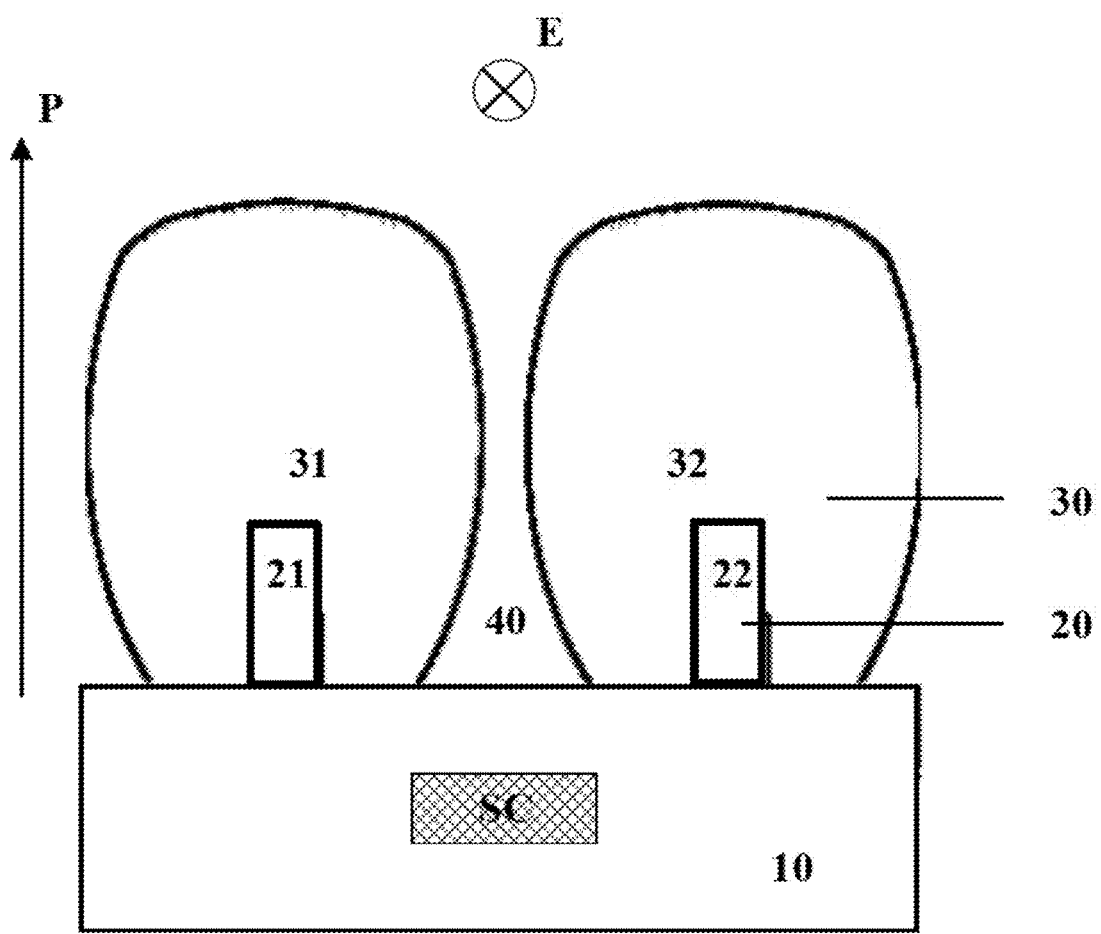
FIG. 2B is a cross-sectional view of a micro-channel structure in some embodiments according to the present disclosure.

FIG. 1 is a cross-sectional view of a micro-channel structure in some embodiments according to the present disclosure. FIG. 2A is a cross-sectional view of a micro-channel structure in some embodiments according to the present disclosure. FIG. 3 is a cross-sectional view along the A-A' line in FIG. 1. Referring to FIGS. 1 to 3, the micro-channel structure in some embodiments includes a base substrate 10, a rail layer 20 on the base substrate 10, and a wall layer 30 on a side of the rail layer 20 distal to the base substrate 10. The rail layer 20 includes a first rail 21 and a second rail 22 spaced apart from each other. The wall layer 30 includes a first wall 31 and a second wall 32 at least partially spaced apart from each other, thereby forming a micro-channel 40 between the first wall 31 and the second wall 32. As shown in FIG. 3, the micro-channel 40 has an extension direction E along a plane substantially parallel to a main surface S of the base substrate 10, the extension direction being substantially parallel to extension directions of the first rail 21 and the second rail 22 along the plane substantially parallel to the main surface S of the base substrate 10.

Optionally, an orthographic projection of the first wall 31 on the base substrate 10 substantially covers an orthographic projection of the first rail 21 on the base substrate 10. Optionally, an orthographic projection of the second wall 32 on the base substrate 10 substantially covers an orthographic projection of the second rail 22 on the base substrate 10. Optionally, the extension direction E of the micro-channel 40 along a plane substantially parallel to a main surface S of the base substrate 10 is substantially parallel to extension directions of the first wall 31 and the second wall 32 along the plane substantially parallel to the main surface S of the base substrate 10.

Referring to FIG. 2A, in some embodiments, the first wall 31 and the second wall 32 are at least partially separated from each other on a side of the micro-channel 40 opposite to the base substrate 10, e.g., the micro-channel 40 is at least partially open on a side opposite to the base substrate 10. Optionally, the first wall 31 and the second wall 32 are separated from each other on the side of the micro-channel 40 opposite to the base substrate 10 over substantially an entire length of the micro-channel 40 along its extension direction E along the plane substantially parallel to the main surface S of the base substrate 10, e.g., the micro-channel 40 is a micro-groove. Optionally, the first wall 31 and the second wall 32 are separated from each other on the side of the micro-channel 40 opposite to the base substrate 10 over one or more first portions of the length of the micro-channel 40 along its extension direction E along the plane substantially parallel to the main surface S of the base substrate 10, and are connected to each other on the side of the micro-channel 40 opposite to the base substrate 10 over one or more second portions of the length of the micro-channel 40 along its extension direction E along the plane substantially parallel to the main surface S of the base substrate 10.

Referring to FIG. 2A, in some embodiments, the first wall 31 protrudes away from a side of the first rail 21 distal to the base substrate 10 along a protrusion direction P, the second wall 32 protrudes away from a side of the second rail 22 distal to the base substrate 10 along the protrusion direction P. The first wall 31 and the second wall 32 are completely spaced apart from each other along the protrusion direction P in at least a portion of the wall layer 30 thereby forming the micro-channel 40 that is at least partially open on a side opposite to the base substrate 10.

Referring to FIG. 1, in some embodiments, the first wall 31 and the second wall 32 are connected to each other on a side of the micro-channel 40 opposite to the base substrate 10. Optionally, the micro-channel 40 is substantially closed on a side opposite to the base substrate 10, e.g., the micro-channel 40 is a micro-capillary. Optionally, the first wall 31 and the second wall 32 are connected to each other on the side of the micro-channel 40 opposite to the base substrate 10 over substantially an entire length of the micro-channel 40 along its extension direction E along the plane substantially parallel to the main surface S of the base substrate 10. Optionally, the first wall 31 and the second wall 32 are connected to each other on the side of the micro-channel 40 opposite to the base substrate 10 over one or more first portions of the length of the micro-channel 40 along its extension direction E along the plane substantially parallel to the main surface S of the base substrate 10, and are separated from each other on the side of the micro-channel 40 opposite to the base substrate 10 over one or more second portions of the length of the micro-channel 40 along its extension direction E along the plane substantially parallel to the main surface S of the base substrate 10.

Figure 4:
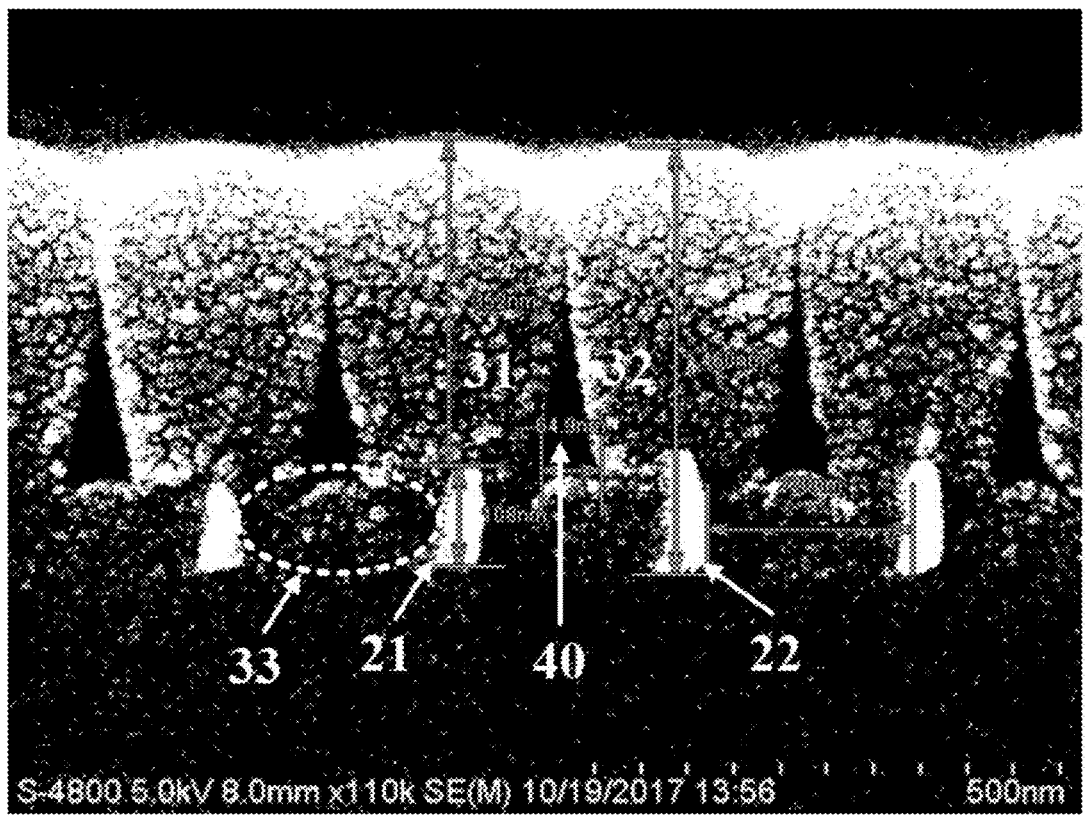
FIG. 4 is a scanning electron microscope image of a cross-section of a micro-channel structure in some embodiments according to the present disclosure.
Figure 5:
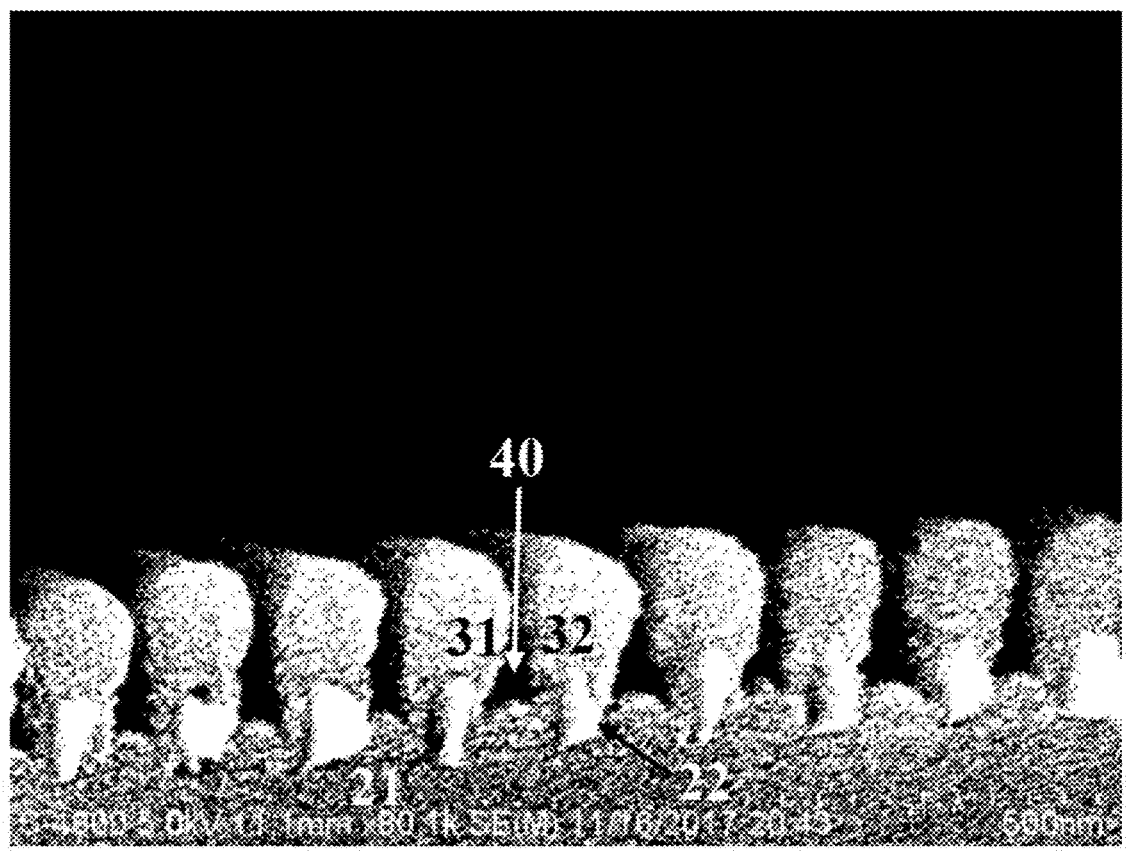
FIG. 5 is a scanning electron microscope image of a cross-section of a micro-channel structure in some embodiments according to the present disclosure.

FIG. 4 is a scanning electron microscope image of a cross-section of a micro-channel structure in some embodiments according to the present disclosure. FIG. 5 is a scanning electron microscope image of a cross-section of a micro-channel structure in some embodiments according to the present disclosure. The micro-channel structure in FIG. 4 corresponds to the micro-channel structure in FIG. 1, in which the micro-channel 40 is substantially closed on a side opposite to the base substrate. e.g., a micro-capillary. The micro-channel structure in FIG. 5 corresponds to the microchannel structure in FIG. 2A, in which the micro-channel 40 is at least partially open on a side opposite to the base substrate. e.g., a micro-groove. The micro-channel 40 in some embodiments has a dimension less than 100 nm, e.g., between 40 nm to 80 nm. The micro-channel may have any appropriate shapes. Optionally, the micro-channel structure has a plurality of turns spaced part by a plurality of walls. Each of the plurality of walls is shared by two adjacent turns.

Referring to FIG. 1 and FIG. 2A, in some embodiments, the wall layer 30 further includes a third wall 33 connecting the first rail 21 and the second rail 22. Optionally, the third wall 33 is in direct contact with the base substrate 10. The third wall 33 forms a bottom side of the micro-channel 40. Optionally, the first wall 31, the second wall 32, and the third wall 33 include a same material, e.g., they are formed in a single process using a same material, e.g., by sputtering. Optionally, the third wall 33 includes a material different from those of the first wall 31 and the second wall 32. For example, the third wall 33 is first formed on the base substrate 10 using a first material, e.g., by sputtering, followed by forming the first wall 31 and the second wall 32 using a second material, e.g., by sputtering.

In some embodiments, the first wall 31 and the second wall 32 are at least partially separated from each other on a side of the micro-channel 40 opposite to the third wall 33, e.g., the micro-channel 40 is at least partially open on a side opposite to the third wall 33. Optionally, the first wall 31 and the second wall 32 are separated from each other on the side of the micro-channel 40 opposite to the third wall 33 over substantially an entire length of the micro-channel 40 along its extension direction E along the plane substantially parallel to the main surface S of the base substrate 10, e.g., the micro-channel 40 is a micro-groove. Optionally, the first wall 31 and the second wall 32 are separated from each other on the side of the micro-channel 40 opposite to the third wall 33 over one or more first portions of the length of the micro-channel 40 along its extension direction E along the plane substantially parallel to the main surface S of the base substrate 10, and are connected to each other on the side of the micro-channel 40 opposite to the third wall 33 over one or more second portions of the length of the micro-channel 40 along its extension direction E along the plane substantially parallel to the main surface S of the base substrate 10.

Referring to FIG. 2A, in some embodiments, the first wall 31 protrudes away from a side of the first rail 21 distal to the base substrate 10 along a protrusion direction P, the second wall 32 protrudes away from a side of the second rail 22 distal to the base substrate 10 along the protrusion direction P. The first wall 31 and the second wall 32 are completely spaced apart from each other along the protrusion direction P in at least a portion of the wall layer 30 thereby forming the micro-channel 40 that is at least partially open on a side opposite to the base substrate 10.

In some embodiments, the first wall 31 and the second wall 32 are connected to each other on a side of the micro-channel 40 opposite to the third wall 33. Optionally, the micro-channel 40 is substantially closed on a side opposite to the third wall 33. e.g., the micro-channel 40 is a micro-capillary. Optionally, the first wall 31 and the second wall 32 are connected to each other on the side of the micro-channel 40 opposite to the third wall 33 over substantially an entire length of the micro-channel 40 along its extension direction E along the plane substantially parallel to the main surface S of the base substrate 10. Optionally, the first wall 31 and the second wall 32 are connected to each other on the side of the micro-channel 40 opposite to the third wall 33 over one or more first portions of the length of the micro-channel 40 along its extension direction E along the plane substantially parallel to the main surface S of the base substrate 10, and are separated from each other on the side of the micro-channel 40 opposite to the third wall 33 over one or more second portions of the length of the micro-channel 40 along its extension direction E along the plane substantially parallel to the main surface S of the base substrate 10.

Optionally, the third wall is absent in the micro-channel structure, and the micro-channel 40 is directly adjacent to the base substrate 10, e.g., the base substrate 10 forms the bottom side of the micro-channel 40. FIG. 2B is a cross-sectional view of a micro-channel structure in some embodiments according to the present disclosure. Referring to FIG. 2B, the micro-channel structure in some embodiments does not include a third wall. The base substrate 10 constitutes the bottom side of the micro-channel 40. The micro-channel 40 is directly adjacent to the base substrate 10.

Figure 2C:
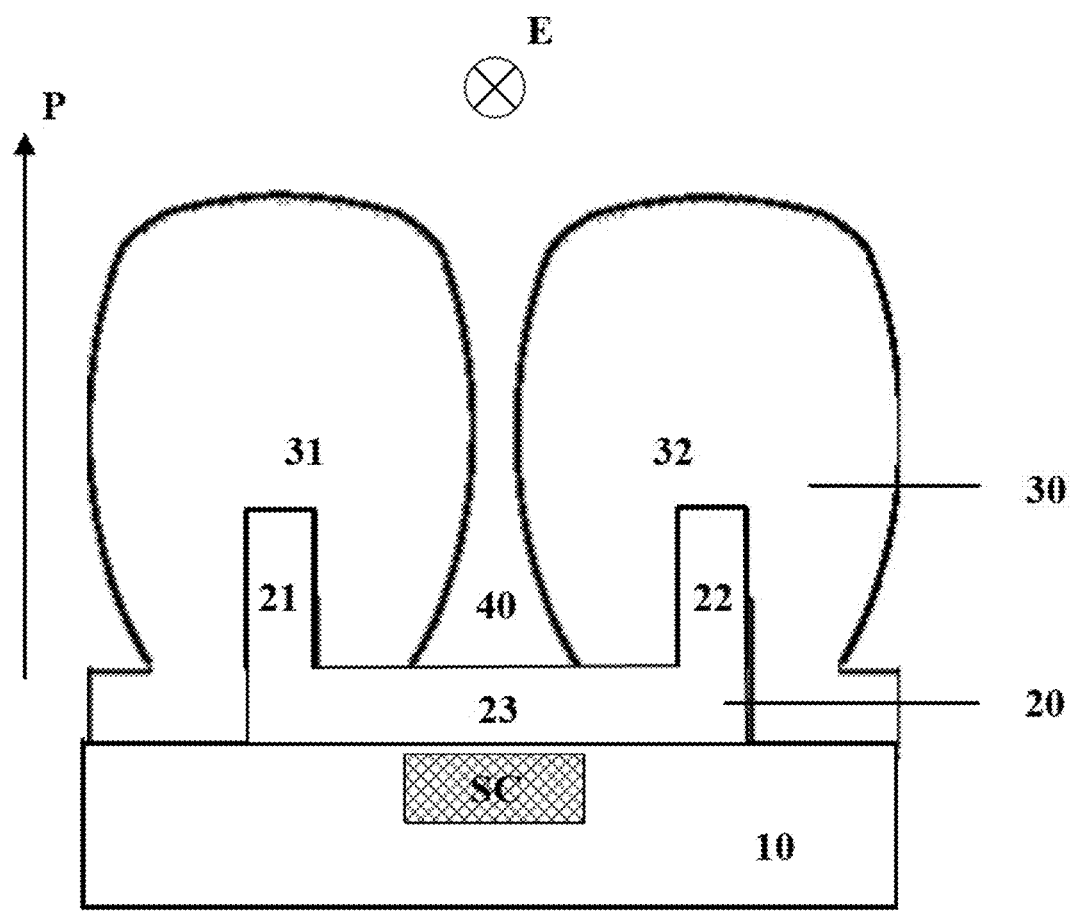
FIG. 2C is a cross-sectional view of a micro-channel structure in some embodiments according to the present disclosure.
Figure 3:
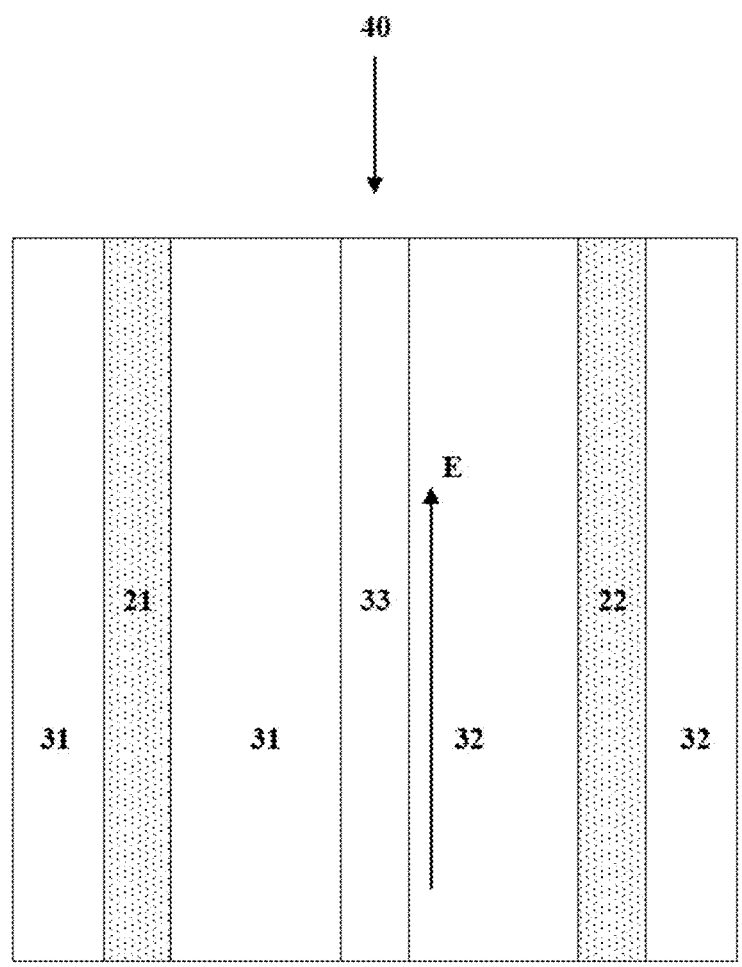
FIG. 3 is a cross-sectional view along the A-A' line in FIG. 1.

FIG. 2C is a cross-sectional view of a micro-channel structure in some embodiments according to the present disclosure. Referring to FIG. 2C, the rail layer 20 in some embodiments includes a first rail 21 and a second rail 22 spaced apart from each other, as well as a base 23 connecting the first rail 21 and the second rail 22. A cross-section along a plane substantially perpendicular to the extension direction E of the rail layer 20 has a U shape. As shown in FIG. 2C, the micro-channel structure in some embodiments does not include a third wall. The base 23 constitutes the bottom side of the micro-channel 40. The micro-channel 40 is directly adjacent to the base 23.

Various appropriate rail layer materials and various appropriate fabrication methods may be used for forming the rail layer. For example, a rail layer material may be formed on the substrate by a photolithography process, an electron beam lithography process, a nanoimprint lithography, an etching process (e.g., dry etching), a hot corrosion process, or any combination thereof. Examples of materials suitable for making the rail layer include, but are not limited to, an insulating material, a semiconductor material, a conductive material, or a combination thereof. Depending on the applications, the rail layer can be made to be conductive, semi-conductive, or insulating.

Various appropriate wall layer materials and various appropriate fabrication methods may be used for forming the wall layer. For example, a wall layer material may be deposited on the substrate by sputtering. Examples of materials suitable for making the wall layer include, but are not limited to, an insulating material, a semiconductor material, a conductive material, or a combination thereof. Depending on the applications, the wall layer can be made to be conductive, semi-conductive, or insulating.

Optionally, the rail layer includes a material different from a material of the wall layer. Optionally, the rail layer and the wall layer are made of a same material.

Depending on the desired function of the micro-channel structure in a device having the micro-channel structure, various appropriate materials may be selected for making each of the wall layer 30, the rail layer 20, and the base substrate 10 based on physical and chemical characteristics that are desirable for the function of the micro-channel structure. Appropriate materials include, but are not limited to, polymeric materials, such as silicone polymers (e.g., polydimethylsiloxane and epoxy polymers), polyimides (e.g., commercially available Kapton® (poly(4,4'-oxydiphenylene-pyromellitimide, from DuPont, Wilmington. Del.) and Upilex™ (poly(biphenyl tetracarboxylic dianhydride), from Ube Industries, Ltd., Japan)), polycarbonates, polyesters, polyamides, polyethers, polyurethanes, polyfluorocarbons, fluorinated polymers (e.g., polyvinylfluoride, polyvinylidene fluoride, polytetrafluoroethylene, polychlorotrifluoroethylene, perfluoroalkoxy polymer, fluorinated ethylene-propylene, polyethylenetetrafluoroethylene, polyethylene chlorotrifluoroethylene, perfluoropolyether, perfluorosulfonic acid, perfluoropolyoxetane, FFPM/FFKM (perfluorinated elastomer [perfluoroelastomer]), FPM/FKM (fluorocarbon [chlorotrifluoroethylenevinylidene fluoride]), as well as copolymers thereof), polyetheretherketones (PEEK), polystyrenes, poly(acrylonitrile-butadiene-styrene)(ABS), acrylate and acrylic acid polymers such as polymethyl methacrylate, and other substituted and unsubstituted polyolefins (e.g., cycloolefin polymer, polypropylene, polybutylene, polyethylene (PE, e.g., cross-linked PE, high-density PE, medium-density PE, linear low-density PE, low-density PE, or ultra-high-molecular-weight PE), polymethylpentene, polybutene-1, polyisobutylene, ethylene propylene rubber, ethylene propylene diene monomer (M-class) rubber), and copolymers thereof (e.g., cycloolefin copolymer); ceramics, such as aluminum oxide, silicon oxide, zirconium oxide, and the like; semiconductors, such as silicon, gallium arsenide, and the like; glass; metals; as well as coated combinations, composites (e.g., a block composite, e.g., an A-B-A block composite, an A-B-C block composite, or the like, of any materials described herein), and laminates (e.g., a composite material formed from several different bonded layers of identical or different materials, such as polymer laminate or polymer-metal laminates, e.g., polymer coated with copper, a ceramic-in-metal or a polymer-in-metal composite) thereof.

In some embodiments, the base substrate on which the micro-channel structure is to be formed is a base substrate having an electrode structure formed prior to forming the micro-channel structure. For example, the base substrate is a substrate having the electrode structure of a sensor, including a sensing circuit, already formed on the base substrate. The micro-channel structure is then formed on the base substrate. In some embodiments, the rail layer is made of a conductive material. Optionally, the first rail and the second rail are two sensor electrodes. e.g., connected to the sensing circuit in the base substrate. The sensor electrodes (the first rail and the second rail) are configured to detect a chemical and/or biological signal in the micro-channel.

Referring to FIG. 1, in some embodiments, the micro-channel structure is a part of a bio-chemical sensor. A fluid (liquidous or gaseous or a combination) flows through the micro-channel 40. A sensing circuit SC is formed on the base substrate 10, and the first rail 21 and the second rail 22 are sensing electrodes for detecting a chemical and/or biological signal in the liquid.

Referring to FIG. 2A, in some embodiments, the micro-channel structure is a part of a gas sensor for detecting a gas. Due to the presence of the micro-channel structure, the gas sensor has a large surface area for absorbing target gas molecules, thus can be a very high sensitivity. The micro-channel 40 is open on a side opposite to the base substrate 10, a gas can flow into the micro-channel 40 from the atmosphere. The inner surface of the micro-channel 40 absorbs target gas molecules. A sensing circuit SC is formed on the base substrate 10, and the first rail 21 and the second rail 22 are sensing electrodes for detecting target gas molecules absorbed on the inner surface of the micro-channel 40.

The present micro-channel structure may be attached to, combined in, integrated into, or otherwise used in various appropriate devices and apparatus. Optionally, the micro-channel structure is a micro-channel structure in a microfluidic device. Optionally, the micro-channel structure is a micro-channel structure in a sensor, e.g., a bio-chemical sensor. Optionally, the micro-channel structure is a micro-channel structure in a lab-on-chip device. Optionally, the micro-channel structure is a microchannel structure in gene sequencing apparatus. As used herein, the term "microfluidic chip" refers to a small device capable of separating molecules using small volumes and/or flow rates. As used herein, the term "lab-on-chip" refers to an integrated chip on which various scientific operations such as reaction, separation, purification, and detection of sample solution are conducted simultaneously. It is possible to perform ultra-high-sensitivity analysis, ultra-trace-amount analysis, or ultra-flexible simultaneous multi-item analysis by using a lab-on-chip. An example of the lab-on-chip is a chip having a protein-producing unit, a protein-purifying unit, and a protein-detecting unit that are connected to each other via microchannels.

The micro-channel structure may be a micro-channel structure in a various appropriate sensors such as a gas sensor, a deoxyribonucleic acid (DNA) sensor, a ribonucleic acid (RNA) sensor, a peptide or protein sensor, an antibody sensor, an antigen sensor, a tissue factor sensor, a vector and virus vector sensor, a lipid and fatty acid sensor, a steroid sensor, a neurotransmitter sensor, an inorganic ion and electrochemical sensor, a pH sensor, a free radical sensor, a carbohydrate sensor, a neural sensor, a chemical sensor, a small molecule sensor, an exon sensor, a metabolite sensor, an intermediates sensor, chromosome sensor, and a cell sensor.

Optionally, the micro-channel 40 has a cross-section along a plane substantially perpendicular to the extension direction having a cross-sectional dimensions in the range of approximately 1 nm to approximately 1000 μm, e.g., approximately 1 mu to approximately 25 nm, approximately 25 nm to approximately 50 nm, approximately 50 nm to approximately 75 nm, approximately 75 nm to approximately 100 nm, approximately 100 nm to approximately 250 nm, approximately 250 nm to approximately 500 nm, approximately 500 nm to approximately 750 nm, approximately 750 nm to approximately 1 μm, approximately 1 μm to approximately 10 μm, approximately 10 μm to approximately 100 μm, approximately 100 μm to approximately 200 μm, approximately 200 μm to approximately 400 μm, approximately 400 μm to approximately 600 μm, approximately 600 μm to approximately 800 μm, and approximately 800 μm to approximately 1000 μm.

Optionally, the micro-channel 40 may have any selected cross-sectional shape, for example, U-shaped, D-shaped, rectangular, triangular, elliptical, oval, circular, semi-circular, square, trapezoidal, pentagonal, hexagonal, etc. cross-sectional geometries. The geometry may be constant or may vary along the length of the micro channel. Further, a micro-channel may have any selected arrangement or configuration, including linear, non-linear, merging, branching, looped, twisting, stepped, etc. configurations. Optionally, the micro-channel has an irregular cross-sectional shape.

Optionally, each of the first rail 21 and the second rail 22 has a cross-section along a plane substantially perpendicular to the extension direction having a cross-sectional dimensions in the range of approximately 1 nm to approximately 1000 μm, e.g., approximately 1 nm to approximately 25 nm, approximately 25 nm to approximately 50 nm, approximately 50 nm to approximately 75 nm, approximately 75 nm to approximately 100 nm, approximately 100 nm to approximately 250 nm, approximately 250 nm to approximately 500 nm, approximately 500 nm to approximately 750 nm, approximately 750 nm to approximately 1 µm, approximately 1 µm to approximately 10 µm, approximately 10 µm to approximately 100 µm, approximately 100 µm to approximately 200 µm, approximately 200 µm to approximately 400 µm, approximately 400 µm to approximately 600 µm, approximately 600 µm to approximately 800 µm, and approximately 800 µm to approximately 1000 µm.

Each of the first rail 21 and the second rail 22 may have any appropriate cross-sectional shape, for example, rectangular, triangular, elliptical, oval, circular, semi-circular, square, trapezoidal, pentagonal, hexagonal, etc. cross-sectional geometries. Optionally, the first rail 21 and the second rail 22 have an irregular cross-sectional shape. The geometry may be constant or may vary along the length of the micro channel. Further, each of the first rail 21 and the second rail 22 may have any selected arrangement or configuration, including linear, non-linear, merging, branching, looped, twisting, stepped, etc. configurations.

Optionally, each of the first wall 31, the second wall 32, and the third wall 33 has a cross-section along a plane substantially perpendicular to the extension direction having a cross-sectional dimension in the range of approximately 1 nm to approximately 1000 µm, e.g., approximately 1 nm to approximately 25 nm, approximately 25 nm to approximately 50 nm, approximately 50 nm to approximately 75 nm, approximately 75 nm to approximately 100 nm, approximately 100 nm to approximately 250 nm, approximately 250 nm to approximately 500 nm, approximately 500 un to approximately 750 un, approximately 750 nm to approximately 1 µm, approximately 1 µm to approximately 10 µm, approximately 10 µm to approximately 100 µm, approximately 100 µm to approximately 200 µm, approximately 200 µm to approximately 400 µm, approximately 400 µm to approximately 600 µm, approximately 600 µm to approximately 800 µm, and approximately 800 µm to approximately 1000 µm.

Each of the first wall 31, the second wall 32, and the third wall 33 may have any appropriate cross-sectional shape, for example, rectangular, triangular, elliptical, oval, circular, semi-circular, square, trapezoidal, pentagonal, hexagonal, etc. cross-sectional geometries. Optionally, the first wall 31, the second wall 32, and the third wall 33 have an irregular cross-sectional shape. The geometry may be constant or may vary along the length of the micro channel. Further, each of the first wall 31, the second wall 32, and the third wall 33 may have any selected arrangement or configuration, including linear, non-linear, merging, branching, looped, twisting, stepped, etc. configurations.

Optionally, a normal distance along the direction substantially parallel to the main surface of the base substrate between the first rail 21 and the second rail 22 is in the range of approximately 10 nm to approximately 1000 µm, e.g., approximately 10 nm to approximately 25 nm, approximately 25 nm to approximately 50 nm, approximately 50 nm to approximately 75 nm, approximately 75 nm to approximately 100 mu, approximately 100 nm to approximately 250 nm, approximately 250 m to approximately 500 nm, approximately 500 nm to approximately 750 nm, approximately 750 nm to approximately 1 µm, approximately 1 µm to approximately 10 µm, approximately 10 µm to approximately 100 µm, approximately 100 µm to approximately 200 µm, approximately 200 µm to approximately 400 µm, approximately 400 µm to approximately 600 µm, approximately 600 µm to approximately 800 µm, and approximately 800 µm to approximately 1000 µm.

Optionally, a ratio between a width along the direction substantially parallel to the main surface of the base substrate of the cross-section of the micro-channel 40 along a plane substantially perpendicular to the extension direction and the normal distance along the direction substantially parallel to the main surface of the base substrate between the first rail 21 and the second rail 22 is in the range of approximately 1:1.5 to approximately 1:100, e.g., approximately 1:1.5 to approximately 1:2, approximately 1:2 to approximately 1:3, approximately 1:3 to approximately 1:4, approximately 1:4 to approximately 1:5, approximately 1:5 to approximately 1:6, approximately 1:6 to approximately 1:7, approximately 1:7 to approximately 1:8, approximately 1:8 to approximately 1:9, approximately 1:9 to approximately 1:10, approximately 1:10 to approximately 1:20, approximately 1:20 to approximately 1:30, approximately 1:30 to approximately 1:40, approximately 1:40 to approximately 1:50, approximately 1:50 to approximately 1:60, approximately 1:60 to approximately 1:70, approximately 1:70 to approximately 1:80, approximately 1:80 to approximately 1:90, and approximately 1:90 to approximately 1:100. Optionally, the ratio between the width along the direction substantially parallel to the main surface of the base substrate of the cross-section of the micro-channel 40 along a plane substantially perpendicular to the extension direction and the normal distance along the direction substantially parallel to the main surface of the base substrate between the first rail 21 and the second rail 22 is in the range of approximately 1:2 to approximately 1:10, e.g., approximately 1:3 to approximately 1:4.

Optionally, a ratio between a width along the direction substantially parallel to the main surface of the base substrate of the cross-section of the micro-channel 40 along a plane substantially perpendicular to the extension direction and a width along the direction substantially parallel to the main surface of the base substrate of the cross-section of the third wall 33 along the plane substantially perpendicular to the extension direction is in the range of approximately 1:1.5 to approximately 1:100, e.g., approximately 1:1.5 to approximately 1:2, approximately 1:2 to approximately 1:3, approximately 1:3 to approximately 1:4, approximately 1:4 to approximately 1:5, approximately 1:5 to approximately 1:6, approximately 1:6 to approximately 1:7, approximately 1:7 to approximately 1:8, approximately 1:8 to approximately 1:9, approximately 1:9 to approximately 1:10, approximately 1:10 to approximately 1:20, approximately 1:20 to approximately 1:30, approximately 1:30 to approximately 1:40, approximately 1:40 to approximately 1:50, approximately 1:50 to approximately 1:60, approximately 1:60 to approximately 1:70, approximately 1:70 to approximately 1:80, approximately 1:80 to approximately 1:90, and approximately 1:90 to approximately 1:100. Optionally, the ratio between the width along the direction substantially parallel to the main surface of the base substrate of the cross-section of the micro-channel 40 along a plane substantially perpendicular to the extension direction and the width along the direction substantially parallel to the main surface of the base substrate of the cross-section of the third wall 33 along the plane substantially perpendicular to the extension direction is in the range of approximately 1:2 to approximately 1:10, e.g., approximately 1:3 to approximately 1:4.

Optionally, a ratio between a width along the direction substantially parallel to the main surface of the base substrate of the cross-section of the micro-channel 40 along a plane substantially perpendicular to the extension direction and a width along the direction substantially parallel to the main surface of the base substrate of the cross-section of the first wall 31 along a plane substantially perpendicular to the extension direction is in the range of approximately 1:1.5 to approximately 1:100, e.g., approximately 1:1.5 to approximately 1:2, approximately 1:2 to approximately 1:3, approximately 1:3 to approximately 1:4, approximately 1:4 to approximately 1:5, approximately 1:5 to approximately 1:6, approximately 1:6 to approximately 1:7, approximately 1:7 to approximately 1:8, approximately 1:8 to approximately 1:9, approximately 1:9 to approximately 1:10, approximately 1:10 to approximately 1:20, approximately 1:20 to approximately 1:30, approximately 1:30 to approximately 1:40, approximately 1:40 to approximately 1:50, approximately 1:50 to approximately 1:60, approximately 1:60 to approximately 1:70, approximately 1:70 to approximately 1:80, approximately 1:80 to approximately 1:90, and approximately 1:90 to approximately 1:100. Optionally, the ratio between the width along the direction substantially parallel to the main surface of the base substrate of the cross-section of the micro-channel 40 along a plane substantially perpendicular to the extension direction and the width along the direction substantially parallel to the main surface of the base substrate of the cross-section of the first wall 31 along a plane substantially perpendicular to the extension direction is in the range of approximately 1:2 to approximately 1:10, e.g., approximately 1:3 to approximately 1:4.

Optionally, a ratio between a width along the direction substantially parallel to the main surface of the base substrate of the cross-section of the micro-channel 40 along a plane substantially perpendicular to the extension direction and a width along the direction substantially parallel to the main surface of the base substrate of the cross-section of the second wall 32 along a plane substantially perpendicular to the extension direction is in the range of approximately 1:1.5 to approximately 1:100, e.g., approximately 1:1.5 to approximately 1:2, approximately 1:2 to approximately 1:3, approximately 1:3 to approximately 1:4, approximately 1:4 to approximately 1:5, approximately 1:5 to approximately 1:6, approximately 1:6 to approximately 1:7, approximately 1:7 to approximately 1:8, approximately 1:8 to approximately 1:9, approximately 1:9 to approximately 1:10, approximately 1:10 to approximately 1:20, approximately 1:20 to approximately 1:30, approximately 1:30 to approximately 1:40, approximately 1:40 to approximately 1:50, approximately 1:50 to approximately 1:60, approximately 1:60 to approximately 1:70, approximately 1:70 to approximately 1:80, approximately 1:80 to approximately 1:90, and approximately 1:90 to approximately 1:100. Optionally, the ratio between the width along the direction substantially parallel to the main surface of the base substrate of the cross-section of the micro-channel 40 along a plane substantially perpendicular to the extension direction and the width along the direction substantially parallel to the main surface of the base substrate of the cross-section of the second wall 32 along a plane substantially perpendicular to the extension direction is in the range of approximately 1:2 to approximately 1:10, e.g., approximately 1:3 to approximately 1:4.

Optionally, a ratio between a height along the protrusion direction of the cross-section of the first rail 21 along a plane substantially perpendicular to the extension direction and a height along the protrusion direction of the cross-section of the first wall 31 along a plane substantially perpendicular to the extension direction is in the range of approximately 1:1.5 to approximately 1:100, e.g., approximately 1:1.5 to approximately 1:2, approximately 1:2 to approximately 1:3, approximately 1:3 to approximately 1:4, approximately 1:4 to approximately 1:5, approximately 1:5 to approximately 1:6, approximately 1:6 to approximately 1:7, approximately 1:7 to approximately 1:8, approximately 1:8 to approximately 1:9, approximately 1:9 to approximately 1:10, approximately 1:10 to approximately 1:20, approximately 1:20 to approximately 1:30, approximately 1:30 to approximately 1:40, approximately 1:40 to approximately 1:50, approximately 1:50 to approximately 1:60, approximately 1:60 to approximately 1:70, approximately 1:70 to approximately 1:80, approximately 1:80 to approximately 1:90, and approximately 1:90 to approximately 1:100. Optionally, the ratio between the height along the protrusion direction of the cross-section of the first rail 21 along a plane substantially perpendicular to the extension direction and the height along the protrusion direction of the cross-section of the first wall 31 along a plane substantially perpendicular to the extension direction is in the range of approximately 1:2 to approximately 1:10, e.g., approximately 1:3 to approximately 1:4.

Optionally, a ratio between a height along the protrusion direction of the cross-section of the second rail 22 along a plane substantially perpendicular to the extension direction and a height along the protrusion direction of the cross-section of the second wall 32 along a plane substantially perpendicular to the extension direction is in the range of approximately 1:1.5 to approximately 1:100, e.g., approximately 1:1.5 to approximately 1:2, approximately 1:2 to approximately 1:3, approximately 1:3 to approximately 1:4, approximately 1:4 to approximately 1:5, approximately 1:5 to approximately 1:6, approximately 1:6 to approximately 1:7, approximately 1:7 to approximately 1:8, approximately 1:8 to approximately 1:9, approximately 1:9 to approximately 1:10, approximately 1:10 to approximately 1:20, approximately 1:20 to approximately 1:30, approximately 1:30 to approximately 1:40, approximately 1:40 to approximately 1:50, approximately 1:50 to approximately 1:60, approximately 1:60 to approximately 1:70, approximately 1:70 to approximately 1:80, approximately 1:80 to approximately 1:90, and approximately 1:90 to approximately 1:100. Optionally, the ratio between the height along the protrusion direction of the cross-section of the second rail 22 along a plane substantially perpendicular to the extension direction and the height along the protrusion direction of the cross-section of the second wall 32 along a plane substantially perpendicular to the extension direction is in the range of approximately 1:2 to approximately 1:10, e.g., approximately 1:3 to approximately 1:4.

Figure 6A:
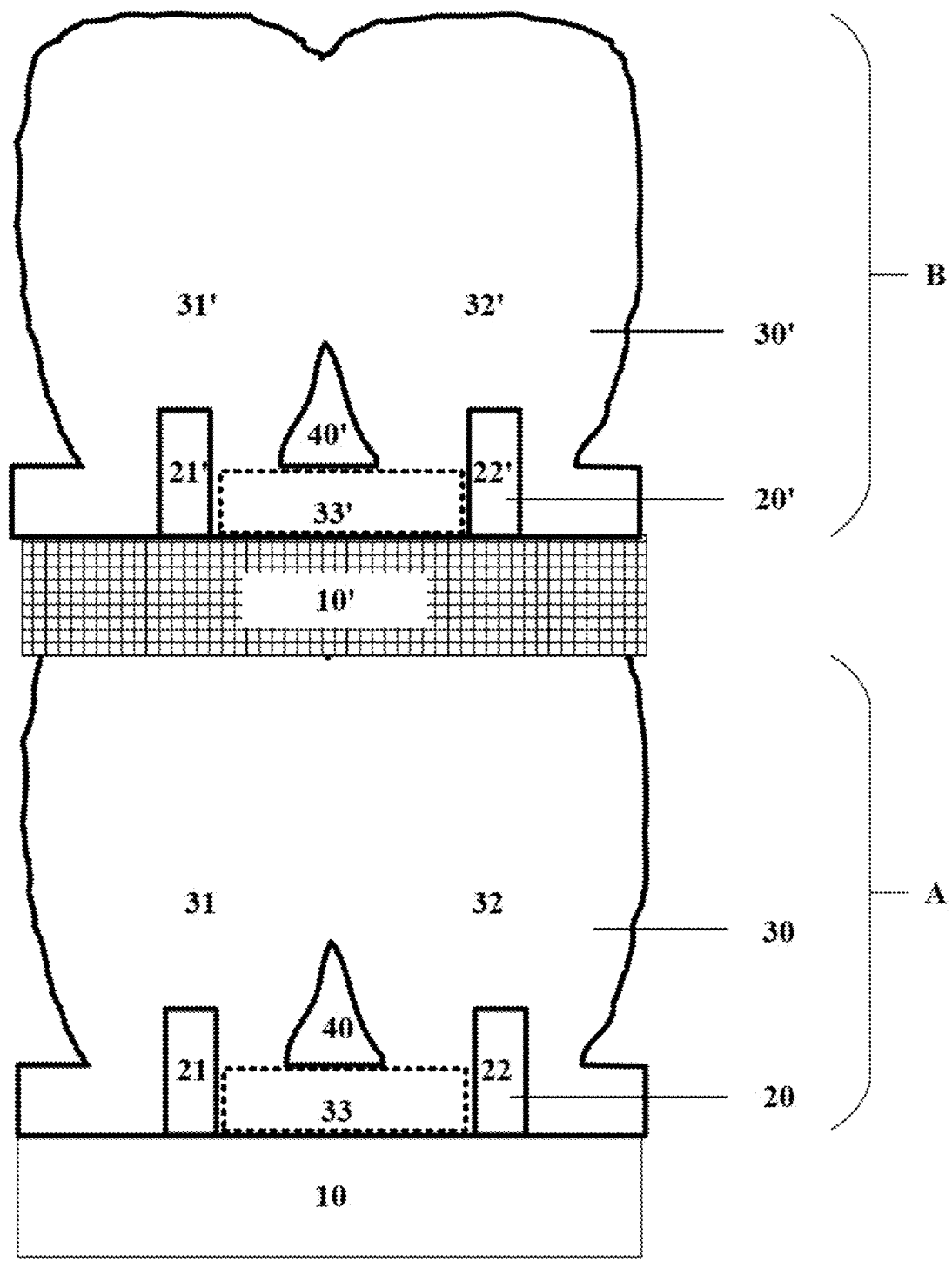
FIGS. 6A and 6B are cross-sectional views of multi-layer micro-channel structures in some embodiments according to the present disclosure.
Figure 6B:
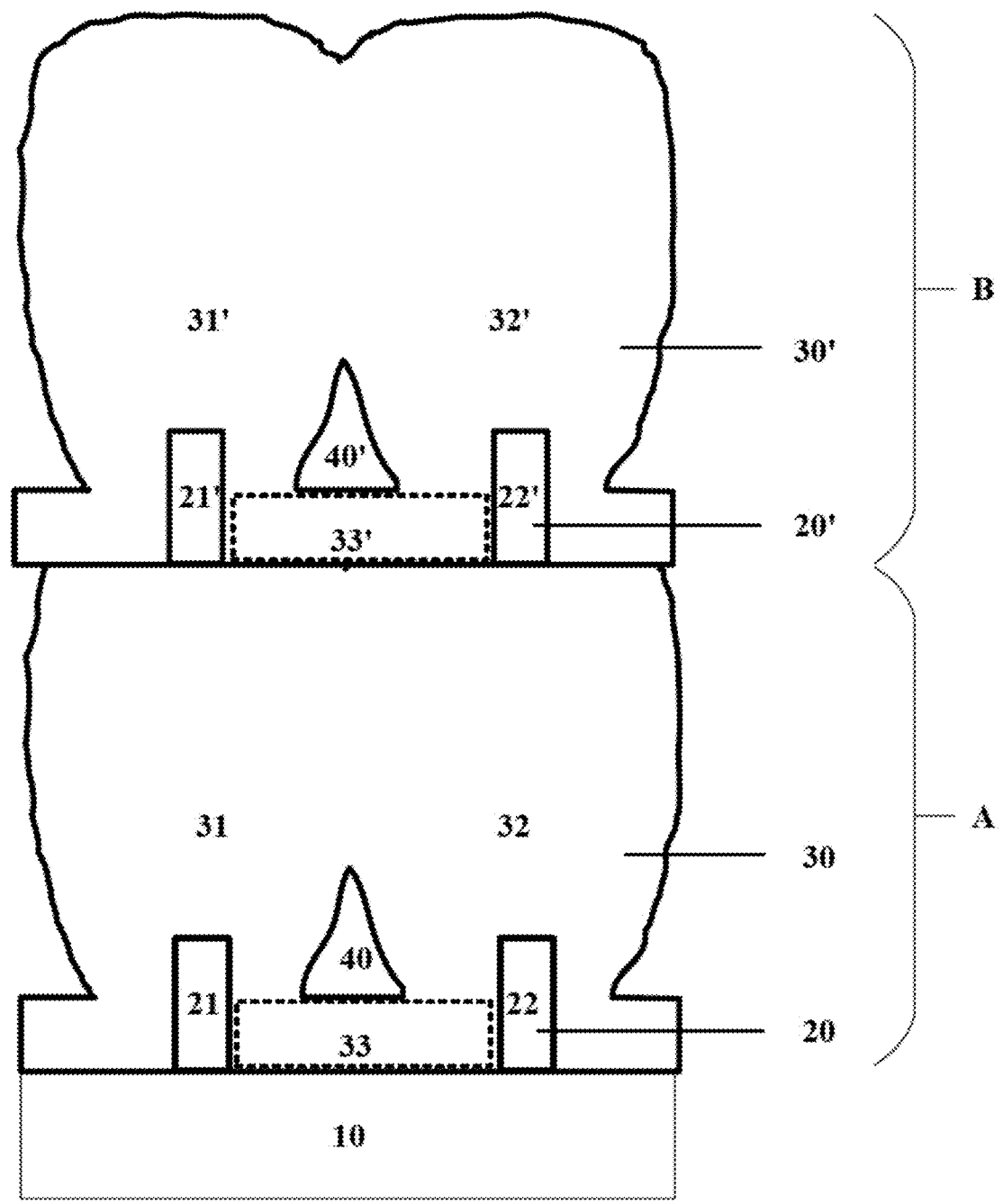

Various implementations of the present micro-channel structure may be practiced. In some embodiments, the present disclosure provides a multi-layer micro-channel structure. FIGS. 6A to 6B are cross-sectional views of multi-layer micro-channel structures in some embodiments according to the present disclosure. Referring to FIGS. 6A to 6B, the multi-layer micro-channel structure includes a first layer A of the multi-layer micro-channel structure and second layer B of the multi-layer micro-channel structure stacked on top of the first layer A. Each layer of the multi-layer micro-channel structure has a micro-channel structure described herein. For example, each layer of the multi-layer micro-channel structure may have any one of the micro-channel structures depicted in FIGS. 1, 2A, 2B, and 2C.

In some embodiments, and referring to FIG. 6A, the first layer A of the multi-layer micro-channel structure includes a base substrate 10; a rail layer 20 on the base substrate 10 and having a first rail 21 and a second rail 22 spaced apart from each other; a wall layer 30 on a side of the rail layer 20 distal to the base substrate 10, and having a first wall 31 and a second wall 32 at least partially spaced apart from each other, thereby forming a micro-channel 40 between the first wall 31 and the second wall 32. The second layer B of the multi-layer micro-channel structure includes a second base substrate 10'; a second rail layer 20' on the second base substrate 10' and having a third rail 21' and a fourth rail 22' spaced apart from each other; a second wall layer 30' on a side of the second rail layer 20' distal to the second base substrate 10, and having a fourth wall 31' and a fifth wall 32' at least partially spaced apart from each other, thereby forming a second micro-channel 40' between the fourth wall 31' and the fifth wall 32'. The extension directions of the micro-channel 40 and the second micro-channel 40' may be the same. Optionally, the extension directions of the micro-channel 40 and the second micro-channel 40' are different from each other. Optionally, the second base substrate 10' is a planarization layer.

In some embodiments, the multi-layer micro-channel structure does not include a planarization layer between the first layer A of the multi-layer micro-channel structure and the second layer B of the multi-layer micro-channel structure. Referring to FIG. 6B, the first layer A of the multi-layer micro-channel structure includes a base substrate 10; a rail layer 20 on the base substrate 10 and having a first rail 21 and a second rail 22 spaced apart from each other; a wall layer 30 on a side of the rail layer 20 distal to the base substrate 10, and having a first wall 31 and a second wall 32 at least partially spaced apart from each other, thereby forming a micro-channel 40 between the first wall 31 and the second wall 32. The second layer B of the multi-layer micro-channel structure includes a second rail layer 20' on the wall layer 30 and having a third rail 21' and a fourth rail 22' spaced apart from each other; a second wall layer 30' on a side of the second rail layer 20' distal to the wall layer 30, and having a fourth wall 31' and a fifth wall 32' at least partially spaced apart from each other, thereby forming a second micro-channel 40' between the fourth wall 31' and the fifth wall 32'. The extension directions of the micro-channel 40 and the second micro-channel 40' may be the same. Optionally, the extension directions of the micro-channel 40 and the second micro-channel 40' are different from each other. The wall layer 30 constitutes a second base substrate on which the second layer B of the multi-layer micro-channel structure is formed.

In another aspect, the present disclosure provides a micro-fluidic device having a micro-channel and electrodes integrated in the micro-fluidic device. The integrated electrodes, for example the first rail 21 and the second rail 22 as shown in FIG. 1, FIGS. 2A to 2C, can effectively detect various physical and/or chemical parameters inside the micro-channel 40. Examples of appropriate parameters that can be measured by the integrated electrodes include a resistance in a region in the micro-channel 40 between the two integrated electrodes, a voltage level in the region in the micro-channel 40 between the two integrated electrodes, a capacitance in the region in the micro-channel 40 between the two integrated electrodes, and so on. By measuring these parameters, the micro-fluidic device can efficiently detect biological and chemical molecules in the micro-channel 40, and can be used in various relevant applications such as gene sequencing.

Moreover, the micro-fluidic device having the integrated electrodes can be conveniently used as an active control device. Specifically, an external voltage or external electrical field can be applied through the integrated electrodes to the region in the micro-channel 40 between the two integrated electrodes, thereby effectively altering the electrochemical properties of the micro-channel 40. In one example, the external voltage applied to the integrated electrodes can change the size of an area of an electrostatic repulsive region in the micro-channel 40. In another example, the micro-fluidic device is a transport control device, and the integrated electrodes can control the transport of a substance through the micro-channel 40. For example, the integrated electrodes can be configured to control the micro-channel 40 so that only molecules having a size or molecule weight in a certain range can pass through, thereby filtering or enriching a target substance. In one example, the micro-fluidic device is a filter. In another example, the micro-fluidic device is a separator configured to separate one molecule from another. In another example, the micro-fluidic device is an enricher configured to purify certain molecules.

In some embodiments, the micro-fluidic device includes a control electrode (e.g., a gate electrode). Optionally, the rail layer constitutes the control electrode of the micro-fluidic device for controlling transport of a substance (e.g., nucleic acid molecules such as DNA) through the micro-channel. Referring to FIG. 2C, the rail layer 20 in some embodiments includes a first rail 21 and a second rail 22 spaced apart from each other, as well as a base 23 connecting the first rail 21 and the second rail 22. A cross-section along a plane substantially perpendicular to the extension direction E of the rail layer 20 has a U shape. The U-shaped rail layer in some embodiments is used as the control electrode of the micro-fluidic device. By having a U-shaped control electrode, the electrical field generated by the control electrode is much enhanced, increasing the strength of the electrical field distributed throughout the micro-channel 40 and the uniformity of the electrical field. As a result, the performance of the micro-fluidic device can be much improved as compared to conventional micro-fluidic devices. The present micro-fluidic device has numerous applications in the micro-fluidic technology, examples of which include ion valves, molecule valves, electrically-controlled micro-fluidic devices, photo-controlled micro-fluidic devices, ionic transistors, and so on.

Figure 7A:
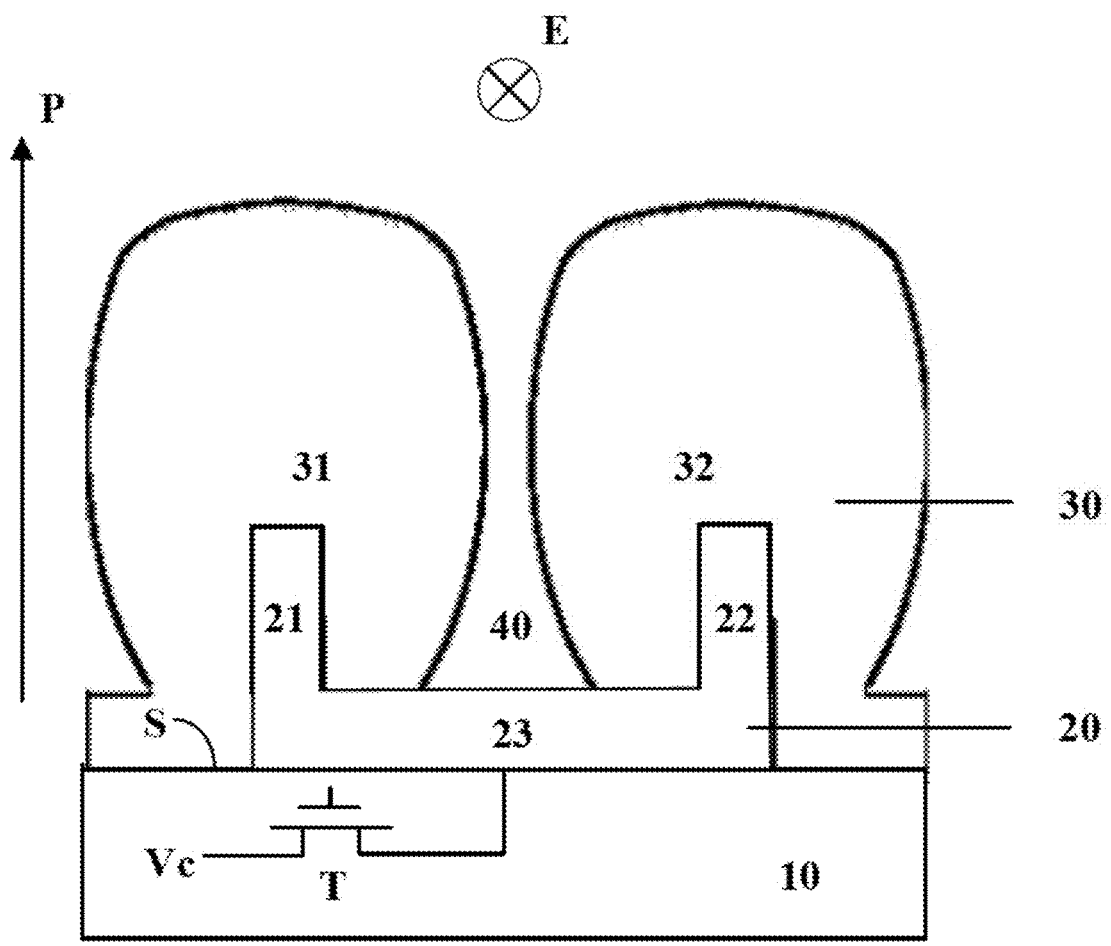

FIGS. 7A and 7B are schematic diagrams of micro-fluidic devices in some embodiments according to the present disclosure. Referring to FIG. 7A, the micro-fluidic device in some embodiments is an electrically-controlled micro-fluidic device having a transistor T electrically connected to the rail layer 20 of the micro-channel structure. The transistor T is configured to be provided with a control voltage Vc. When the transistor T is turned on, the control voltage Vc is passed to the rail layer 20. Optionally, as discussed above, the micro-channel structure is one for controlling transport of a substance through the micro-channel 40, and the rail layer 20 is a control electrode of the micro-fluidic device. By transmitting the control voltage Vc to the rail layer 20, the transport of a substance in the micro-channel 40 can be controlled electrically.

Referring to FIG. 7B, the micro-fluidic device in some embodiments is a photo-controlled micro-fluidic device having a photosensor PS electrically connected to the rail layer 20. When the photosensor PS is irradiated, it generates a photo-voltage signal, which is transmitted to the rail layer 20. Optionally, as discussed above, the micro-channel structure is one for controlling transport of a substance through the micro-channel 40, and the rail layer 20 is a control electrode of the micro-fluidic device. By transmitting the photo-voltage signal to the rail layer 20, the transport of a substance in the micro-channel 40 can be photo-controlled.

Figure 8:
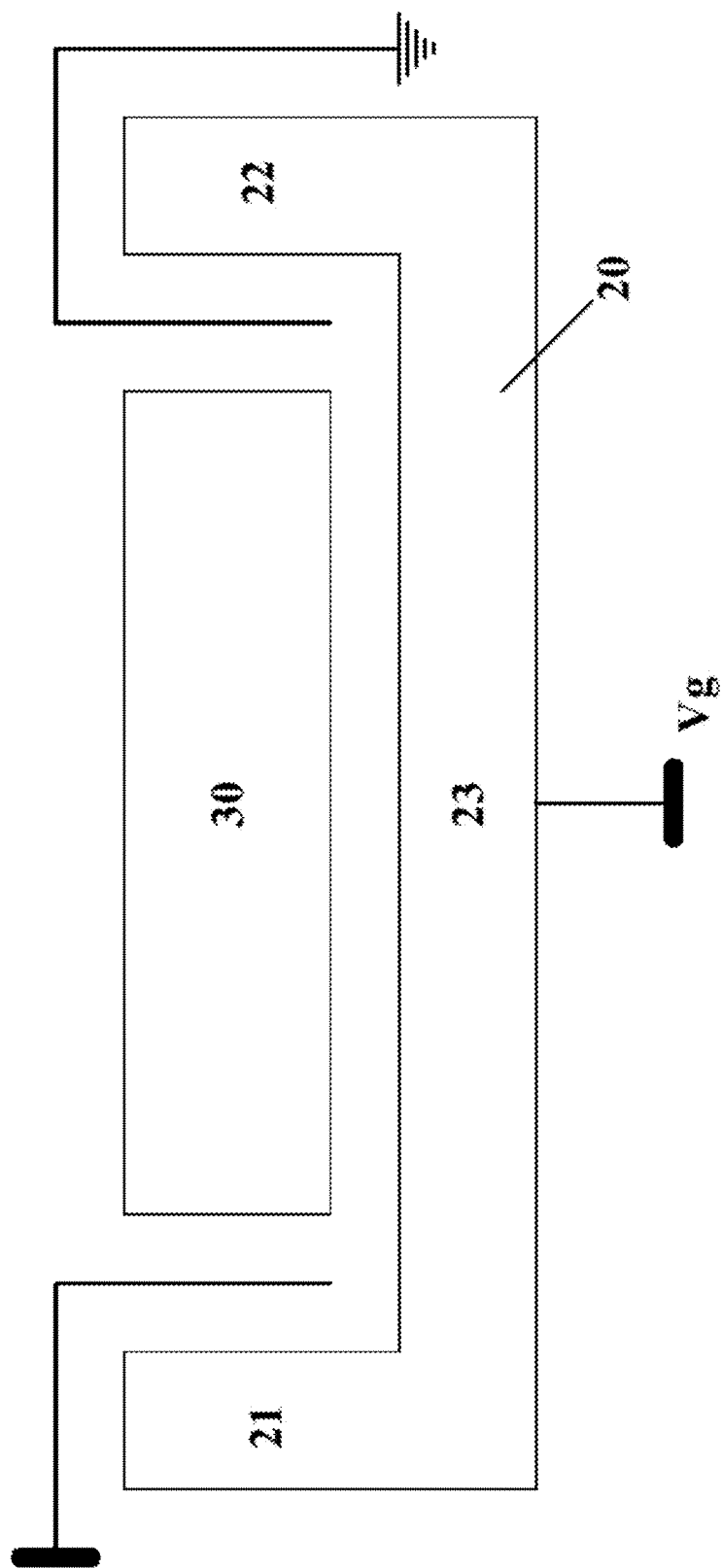
FIG. 8 is a schematic diagram illustrating the structure of an ionic transistor having a micro-channel in some embodiments according to the present disclosure.

Optionally, the micro-fluidic device is an ionic transistor. FIG. 8 is a schematic diagram illustrating the structure of an ionic transistor having a micro-channel in some embodiments according to the present disclosure. Referring to FIG. 8, the rail layer 20 is used as a gate electrode of the ionic transistor, and is configured to be provided with a gate driving signal Vg. Referring to FIG. 8, the rail layer 20 in some embodiments includes a first rail 21 and a second rail 22 spaced apart from each other, as well as a base 23 connecting the first rail 21 and the second rail 22. A cross-section along a plane substantially perpendicular to the extension direction of the rail layer 20 has a U shape. The U-shaped rail layer in some embodiments is the gate electrode of the ionic transistor.

Figure 9:
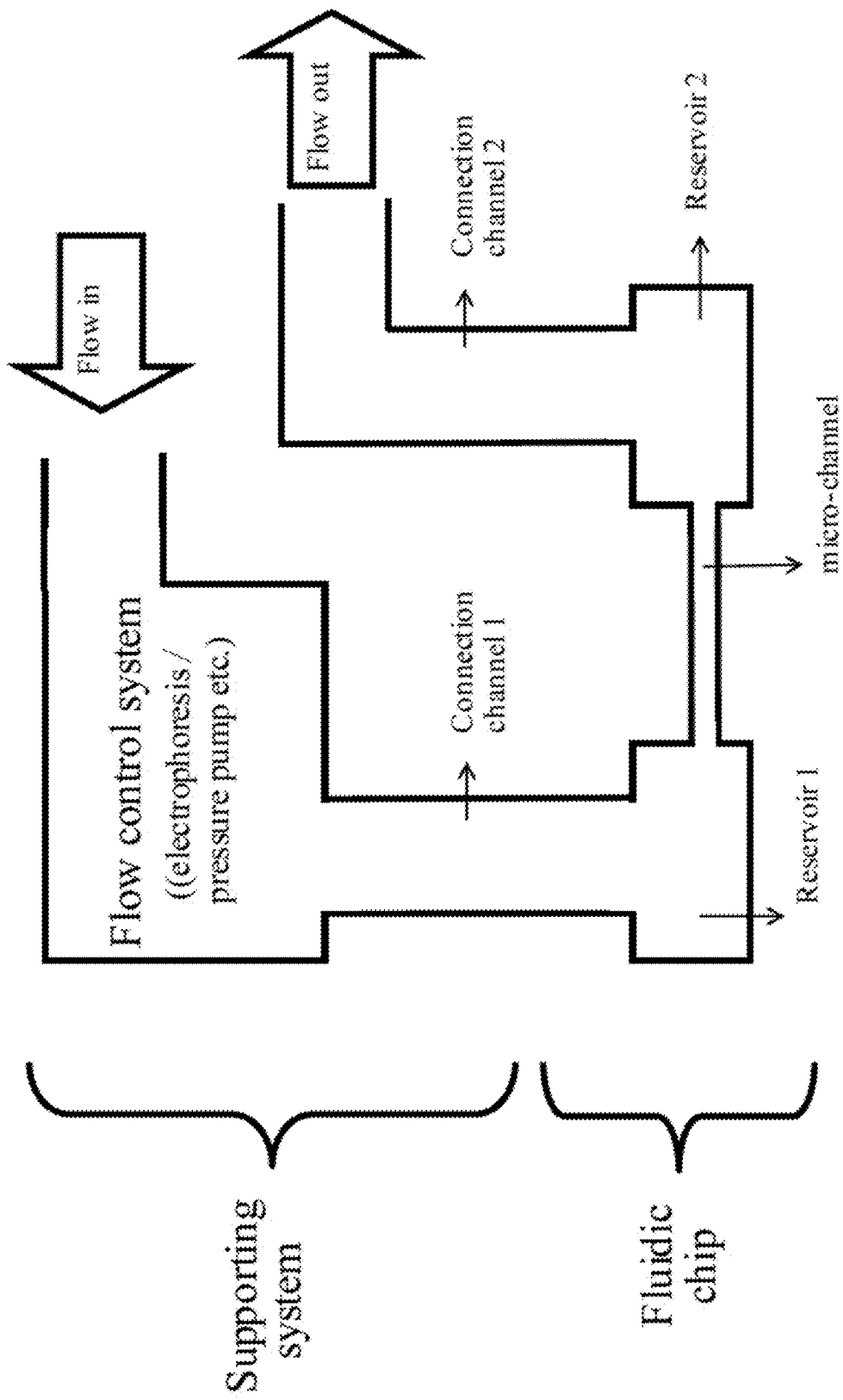
FIG. 9 is a schematic diagram illustrating an application of a micro-channel in a micro-fluidic device in some embodiments according to the present disclosure.

FIG. 9 is a schematic diagram illustrating an application of a micro-channel in a micro-fluidic device in some embodiments according to the present disclosure. Referring to FIG. 9, a fluid sample (e.g., a gas or a liquid) is driven by a flow control system to flow into a connection channel 1. The flow control system in some embodiments includes one or a combination of electrophoresis, pressure pumps, and other driving mechanisms. Through the connection channel 1, the fluid sample flows into a reservoir 1 which is in turn connected to a micro-channel according to the present disclosure. The reservoir 1 itself may be a micro-scale channel. The fluid sample then flows into the micro-channel, which controls the transport of the fluid sample in the fluidic chip. Under the control of the micro-channel, the fluid sample flows into a reservoir 2, a connection channel 2, and eventually flows out of the fluidic chip.

In another aspect, the present disclosure provides a sensor including the micro-channel structure described herein or fabricated by a method described herein.

In another aspect, the present disclosure provides a sensing system having the sensor described herein.

In another aspect, the present disclosure provides a micro-fluidic device including the micro-channel structure described herein or fabricated by a method described herein.

In another aspect, the present disclosure provides a micro-fluidic system having the micro-fluidic device described herein.

In another aspect, the present disclosure provides a lab-on-chip device including the micro-channel structure described herein or fabricated by a method described herein.

In another aspect, the present disclosure provides a lab-on-chip system having the lab-on-chip device described herein.

In another aspect, the present disclosure provides a method of fabricating a micro-channel structure. FIG. 10 is a flow chart illustrating a method of fabricating a micro-channel structure in some embodiments according to the present disclosure. Referring to FIG. 10, the method in some embodiments includes forming a rail layer on a base substrate; and subsequent to forming the rail layer, forming a wall layer on a side of the rail layer distal to the base substrate. Optionally, the step of forming the rail layer includes forming a first rail and a second rail spaced apart from each other. Optionally, the step of forming the wall layer includes forming a first wall and a second wall spaced apart from each other, thereby forming a micro-channel between the first wall and the second wall. Optionally, the micro-channel is formed to have an extension direction along a plane substantially parallel to a main surface of the base substrate, the extension direction being substantially parallel to extension directions of the first rail and the second rail along the plane substantially parallel to the main surface of the base substrate.

Figure 11E:
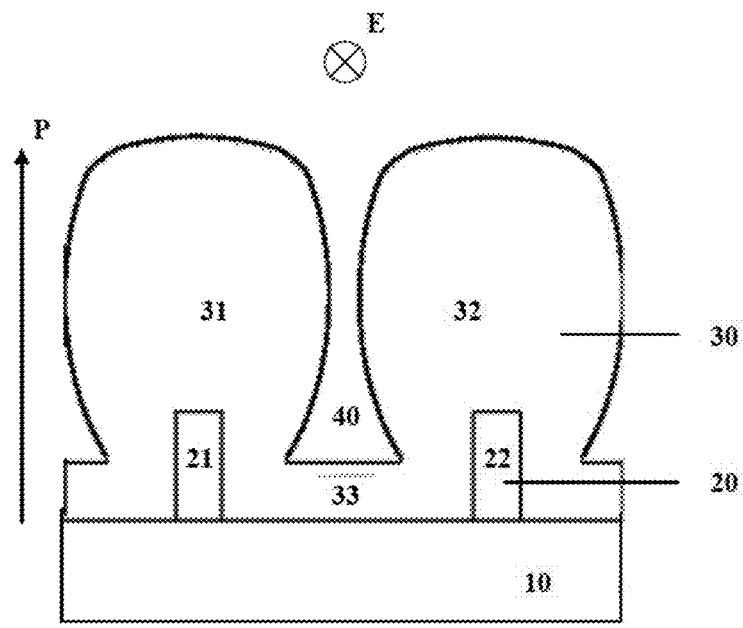

FIGS. 11A to 11F illustrate a process of fabricating a micro-channel structure in some embodiments according to the present disclosure. Referring to FIG. 11A, the base substrate 10 is provided. As compared to conventional micro-channel structure fabrication methods, the present method enables fabrication of a micro-channel structure directly on a base substrate having other components of an electronic device (e.g., a sensor) already formed prior to the formation of the micro-channel structure. Accordingly, the base substrate 10 in some embodiments includes an electrode structure. Optionally, the base substrate 10 is a substrate having the electrode structure of a sensor including a sensing circuit.

Referring to FIG. 11B, a rail layer 20 is formed on the base substrate 10. The step of forming the rail layer 20 in some embodiments includes forming a first rail 21 and a second rail 22. Optionally, the first rail 21 and the second rail 22 are formed in a single patterning step. Examples of appropriate methods for forming the first rail 21 and the second rail 22 include a photolithography process, an electron beam lithography process, a nanoimprint lithography, an etching process (e.g., dry etching), a hot corrosion process, or any combination thereof. In one example, a rail layer material is first deposited on the base substrate 10 thereby forming a rail layer material layer, followed by patterning the rail layer material layer to form the first rail 21 and the second rail 22. Depending on the applications of the micro-channel structure, the rail layer 20 may be made of various appropriate materials, includes an insulating material, a semiconductor material, a conductive material, or a combination thereof.

FIG. 11C is a plan view of the first rail 21 and the second rail 22. Referring to FIG. 11C, in some embodiments, the first rail 21 and the second rail 22 extend substantially parallel to each other and along an extension direction E along a plane substantially parallel to a main surface of the base substrate 10. Optionally, the extension direction E of the first rail 21 and the second rail 22 along the plane substantially parallel to the main surface of the base substrate 10 define the extension direction of the micro-channel to be formed in a subsequent step.

Referring to FIG. 11D, subsequent to forming the rail layer 20, a wall layer material is deposited on a side of the rail layer 20 distal to the base substrate 10, thereby forming a wall layer material layer 30". Due to the presence of the first rail 21 and the second rail 22, the wall layer material first deposits on and around the first rail 21 and the second rail 22 at a relative faster rate as compared to a deposition rate in other regions of the base substrate 10. As shown in FIG. 11D, in some embodiments, the wall layer material layer 30" is formed to have a first protrusion 31" on and around the first rail 21, a second protrusion 32" on and around the second rail 22, and a base 33" connecting the first rail 21 and the second rail 22.

Various appropriate deposition methods and appropriate deposition apparatuses may be used for depositing the wall layer material. Examples of appropriate deposition methods include sputtering (e.g., magnetron sputtering) and evaporation coating (e.g., a Chemical Vapor Deposition method, a Plasma-Enhanced Chemical Vapor Deposition (PECVD) method, a thermal vapor deposition method, an atomic layer deposition (ALD)method, and an electron beam evaporation method). Optionally, the wall layer material is deposited by a sputtering method.

Various appropriate sputtering methods and appropriate sputtering apparatuses may be used for sputtering the wall layer material. Examples of appropriate sputtering apparatuses include a direct current sputtering apparatus, a radio frequency sputtering apparatus, a pulsed direct current sputtering apparatus, a magnetron sputtering apparatus, and a pulsed direct current magnetron sputtering apparatus. Examples of appropriate sputtering includes physical sputtering and reaction sputtering. In one example, the base having the rail layer 20 formed thereon is placed in a sputtering chamber, and is subject to sputtering using a sputtering target material, which includes the wall layer material or precursors thereof. In another example, the sputtering temperature is room temperature, the sputtering atmosphere includes oxygen and argon, the sputtering power is S kW, the sputtering atmosphere pressure is 0.2 Pa, and the sputtering apparatus is a magnetron sputtering apparatus.

In some embodiments, the method further includes controlling a dimension and shape of the micro-channel by controlling a duration or a power of sputtering the wall layer material. The longer the sputtering duration, or the higher the sputtering power, a distance between the first protrusion 31" and the second protrusion 32" becomes larger, and the dimension of the micro-channel becomes smaller.

Referring to FIG. 11E, in some embodiments, a micro-channel 40 is formed between a first wall 31 and a second wall 32. In some embodiments, the sputtering duration or the sputtering power is controlled in a range such that the first wall 31 and the second wall 32 are formed at least partially separated from each other on a side of the micro-channel 40 opposite to the base substrate 10, e.g., the micro-channel 40 is formed to be at least partially open on a side opposite to the base substrate 10. Optionally, the first wall 31 and the second wall 32 are formed to be separated from each other on the side of the micro-channel 40 opposite to the base substrate 10 over substantially an entire length of the micro-channel 40 along its extension direction E along the plane substantially parallel to the main surface of the base substrate 10. Optionally, the first wall 31 and the second wall 32 are formed to be separated from each other on the side of the micro-channel 40 opposite to the base substrate 10 over one or more first portions of the length of the micro-channel 40 along its extension direction E along the plane substantially parallel to the main surface of the base substrate 10, and are formed to be connected to each other on the side of the micro-channel 40 opposite to the base substrate 10 over one or more second portions of the length of the micro-channel 40 along its extension direction E along the plane substantially parallel to the main surface of the base substrate 10.

Referring to FIG. 11E, in some embodiments, the first wall 31 is formed to protrude away from a side of the first rail 21 distal to the base substrate 10 along a protrusion direction P, the second wall 32 is formed to protrude away from a side of the second rail 22 distal to the base substrate 10 along the protrusion direction P. The first wall 31 and the second wall 32 are formed to be completely spaced apart from each other along the protrusion direction P in at least a portion of the wall layer 30 thereby forming the micro-channel 40 that is at least partially open on a side opposite to the base substrate 10.

Figure 11F:
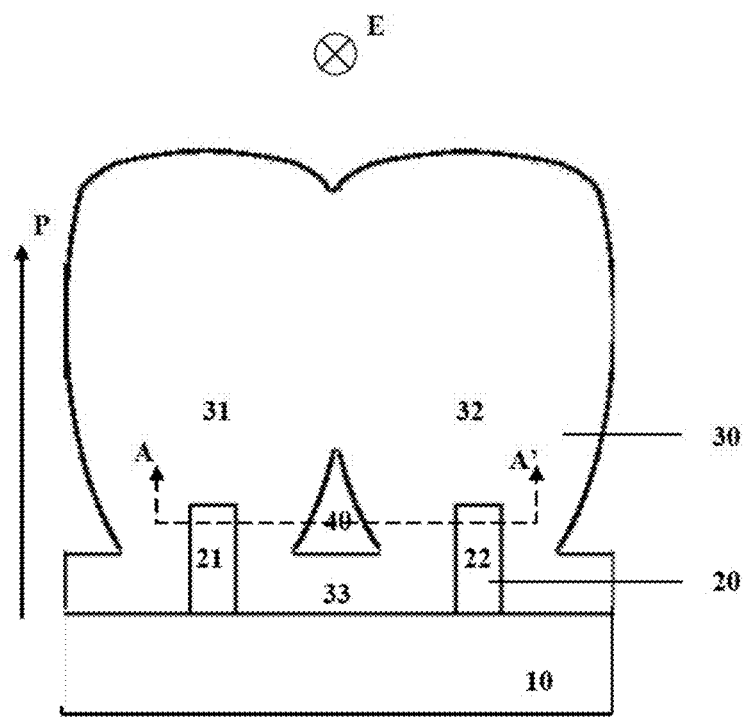

Referring to FIG. 11F, in some embodiments, a micro-channel 40 is formed between a first wall 31 and a second wall 32. In some embodiments, the sputtering duration or the sputtering power is controlled in a range such that the first wall 31 and the second wall 32 are formed to be connected to each other on a side of the micro-channel 40 opposite to the base substrate 10, e.g., the micro-channel 40 is formed to be substantially closed on a side opposite to the base substrate 10. Optionally, the micro-channel 40 is formed to be substantially closed on a side opposite to the base substrate 10. Optionally, the first wall 31 and the second wall 32 are formed to be connected to each other on the side of the micro-channel 40 opposite to the base substrate 10 over substantially an entire length of the micro-channel 40 along its extension direction E along the plane substantially parallel to the main surface of the base substrate 10. Optionally, the first wall 31 and the second wall 32 are formed to be connected to each other on the side of the micro-channel 40 opposite to the base substrate 10 over one or more first portions of the length of the micro-channel 40 along its extension direction E along the plane substantially parallel to the main surface of the base substrate 10, and are formed to be separated from each other on the side of the micro-channel 40 opposite to the base substrate 10 over one or more second portions of the length of the micro-channel 40 along its extension direction E along the plane substantially parallel to the main surface of the base substrate 10.

Referring to FIG. 11E and FIG. 11F, in some embodiments, the step of forming the wall layer father includes forming a third wall 33 connecting the first rail 21 and the second rail 22. As discussed above, the deposition rate of the wall layer material in the region between the first rail 21 and the second rail 22 is relatively smaller as compared the deposition rate on and around the first rail 21 and the second rail 22, the third wall 33 is formed to constitute a bottom side of the micro-channel 40. Optionally, the third wall 33 is formed to be in direct contact with the base substrate 10.

In the present method, a rail layer 20 is first formed as a low-resolution template for forming a high-resolution micro-channel 40. The wall layer material is then sputtered onto the base substrate 10. The first rail 21 and the second rail 22 protrude upward, and serve as major growth points for accumulating the wall layer material. As the wall layer material continues to accumulate on and around the first rail 21 and the second rail 22, widths of the cross-sections of the first protrusion 31" and the second protrusion 32" continue to increase, and the distance between the first protrusion 31" and the second protrusion 32" continue to decrease, thereby forming the high-resolution micro-channel 40. Because the micro-channel 40 is formed by sputtering the wall layer material on the base substrate 10, the resolution of the micro-channel 40 is not limited by the resolution of the patterning device or the etching device. Because the first wall 31 and the second 32 are formed by sputtering the wall layer material, the present method obviates the need for developing suitable etchants respectively for various different micro-channel materials. The present method is applicable for forming the micro-channel 40 using various appropriate materials.

In some embodiments, the wall layer can be formed using a lithography process. Optionally, the lithography process includes a patterning process and an etching process. Examples of patterning processes include UV exposure and development, electron beam exposure and development, laser-based direct write process, nanoimprinting, and so on. Examples of etching processes include dry etching, wet etching, reactive ion beam etching, and high temperature burning.

In some embodiments, the present disclosure provides a method of fabricating a multi-layer micro-channel structure. Optionally, each layer of the multi-layer micro-channel structure may be fabricated by a method of fabricating the micro-channel described herein (e.g., the methods depicted in FIG. 10 and FIGS. 11A to 11F). In some embodiments, the multi-layer micro-channel structure is formed to include a first layer and a second layer, the second layer is formed to be stacked on top of the first layer. Specifically, the step of forming the first layer includes forming a rail layer on a base substrate; and subsequent to forming the rail layer, forming a wall layer on a side of the rail layer distal to the base substrate; the step of forming the second layer includes forming a second rail layer on a second base substrate; and subsequent to forming the second rail layer, forming a second wall layer on a side of the second rail layer distal to the second base substrate. The step of forming the rail layer includes forming a first rail and a second rail spaced apart from each other, and the step of forming the wall layer includes forming a first wall and a second wall spaced apart from each other, thereby forming a micro-channel between the first wall and the second wall. The step of forming the second rail layer includes forming a third rail and a fourth rail spaced apart firm each other, and the step of forming the second wall layer includes forming a fourth wall and a fifth wall spaced apart from each other, thereby forming a second micro-channel between the fourth wall and the fifth wall.

Optionally, the method of fabricating the multi-layer micro-channel structure includes forming the first layer of the multi-layer micro-channel structure on a base substrate; forming a planarization layer on the first layer of the multi-layer micro-channel structure thereby forming a planarized surface; and forming the second layer of the multi-layer micro-channel structure on a side of the planarization layer distal to the base substrate. The planarization layer constitutes the second base substrate for forming the second layer of the multi-layer micro-channel structure.

Optionally, the multi-layer micro-channel structure is formed without a planarization layer between the first layer of the multi-layer micro-channel structure and the second layer of the multi-layer micro-channel structure. Optionally, the method of fabricating the multi-layer micro-channel structure includes forming the first layer of the multi-layer micro-channel structure on a base substrate; and forming the second layer of the multi-layer micro-channel structure on a side of the first layer of the multi-layer micro-channel structure distal to the base substrate. Optionally, the wall layer of the first layer of the multi-layer micro-channel structure constitutes the second base substrate for forming the second layer of the multi-layer micro-channel structure.

In another aspect, the present disclosure provides a method of fabricating a sensor chip. In some embodiments, the method includes forming an electrode structure of the sensor chip on a base substrate; and subsequent to forming the electrode structure, forming one or more micro-channel structures directly on the electrode structure. The step of forming the one or more micro-channel structures can be performed as described above. In some embodiments, the step of forming one or more micro-channel structures includes forming a rail layer on side of the electrode structure distal to the base substrate; and subsequent to forming the rail layer, forming a wall layer on a side of the rail layer distal to the electrode structure. Optionally, the step of forming the rail layer includes forming a first rail and a second rail spaced apart from each other. Optionally, the step of forming the wall layer includes forming a first wall and a second wall at least partially spaced apart from each other, thereby forming a micro-channel between the first wall and the second wall. Optionally, the micro-channel is formed to have an extension direction along a plane substantially parallel to a main surface of the base substrate, the extension direction being substantially parallel to extension directions of the first rail and the second rail along the plane substantially parallel to the main surface of the base substrate.

Optionally, the first rail and the second rail are formed using an electrode material. Optionally, the first rail and the second rail are formed as two sensor electrodes of the sensor chip.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A micro-channel structure, comprising:
    a base substrate;
    a rail layer on the base substrate and comprising a first rail and a second rail spaced apart from each other; and
    a wall layer on a side of the rail layer distal to the base substrate, and comprising a first wall and a second wall at least partially spaced apart from each other, thereby forming a micro-channel between the first wall and the second wall;
    wherein the micro-channel has an extension direction along a plane substantially parallel to a main surface of the base substrate, the extension direction being substantially parallel to extension directions of the first rail and the second rail along the plane substantially parallel to the main surface of the base substrate;
    wherein the wall layer further comprises a third wall connecting the first rail and the second rail; and
    the third wall is in direct contact with the base substrate.

2. The micro-channel structure of claim 1, wherein an orthographic projection of the first wall on the base substrate substantially covers an orthographic projection of the first rail on the base substrate; and
    an orthographic projection of the second wall on the base substrate substantially covers an orthographic projection of the second rail on the base substrate.

3. The micro-channel structure of claim 1, wherein the first wall protrudes away from a side of the first rail distal to the base substrate along a protrusion direction and the second wall protrudes away from a side of the second rail distal to the base substrate along the protrusion direction; and the first wall and the second wall are completely spaced apart from each other along the protrusion direction in at least a portion of the wall layer thereby forming the micro-channel that is at least partially open on a side opposite to the base substrate.

4. The micro-channel structure of claim 1, wherein the first wall protrudes away from a side of the first rail distal to the base substrate along a protrusion direction and the second wall protrudes away from a side of the second rail distal to the base substrate along the protrusion direction; and the first wall and the second wall are connected to each other in a first region of the wall layer and are spaced apart from each other in a second region of the wall layer thereby forming the micro-channel that is substantially closed on a side opposite to the base substrate, the first region on a side of the second region distal to the base substrate along the protrusion direction.

5. The micro-channel structure of claim 1, wherein the rail layer further comprises a base connecting the first rail and the second rail;

a cross-section along a plane substantially perpendicular to the extension directions of the first rail and the second rail has a U shape.

6. The micro-channel structure of claim 1, wherein the first rail and the second rail comprise a conductive material.

7. The micro-channel structure of claim 1, wherein the rail layer comprises a material different from a material of the wall layer.

8. A multi-layer micro-channel structure, comprising a first layer of the multi-layer micro-channel structure and a second layer of the multi-layer micro-channel structure;

wherein the first layer of the multi-layer micro-channel structure comprises:
a base substrate;
a rail layer on the base substrate and comprising a first rail and a second rail spaced apart from each other; and
a wall layer on a side of the rail layer distal to the base substrate, and comprising a first wall and a second wall at least partially spaced apart from each other, thereby forming a micro-channel between the first wall and the second wall;
wherein the micro-channel has an extension direction along a plane substantially parallel to a main surface of the base substrate, the extension direction being substantially parallel to extension directions of the first rail and the second rail along the plane substantially parallel to the main surface of the base substrate;
wherein the second layer of the multi-layer micro-channel structure comprises:
a second base substrate;
a second rail layer on the second base substrate and comprising a third rail and a fourth rail spaced apart from each other; and
a second wall layer on a side of the second rail layer distal to the second base substrate, and comprising a fourth wall and a fifth wall at least partially spaced apart from each other, thereby forming a second micro-channel between the fourth wall and the fifth wall;
wherein the second micro-channel has a second extension direction along a plane substantially parallel to a main surface of the second base substrate, the second extension direction being substantially parallel to extension directions of the third rail and the fourth rail along the plane substantially parallel to the main surface of the second base substrate.

9. A micro-fluidic system, comprising the micro-channel structure of claim 1.

10. The micro-fluidic system of claim 9, further comprising a sensing circuit;
wherein the rail layer constitutes one or more sensing electrodes.

11. The micro-fluidic system of claim 9, wherein the rail layer constitutes a control electrode for controlling transport of a substance in the micro-channel.

12. The micro-fluidic system of claim 10, wherein the first rail and the second rail constitute two separate electrodes of the micro-fluidic system, and configured to control transport of a substance through the micro-channel.

13. The micro-fluidic system of claim 10, comprising an ionic transistor;
wherein the rail layer constitutes a gate electrode of the ionic transistor.

14. The micro-fluidic system of claim 13, wherein the rail layer further comprises a base connecting the first rail and the second rail; and
a cross-section along a plane substantially perpendicular to the extension directions of the first rail and the second rail has a U shape.

15. A method of fabricating a micro-channel structure, comprising:
forming a rail layer on a base substrate; and
subsequent to forming the rail layer, forming a wall layer on a side of the rail layer distal to the base substrate;
wherein forming the rail layer comprises forming a first rail and a second rail spaced apart from each other;
forming the wall layer comprises forming a first wall and a second wall spaced apart from each other, thereby forming a micro-channel between the first wall and the second wall; and
the micro-channel is formed to have an extension direction along a plane substantially parallel to a main surface of the base substrate, the extension direction being substantially parallel to extension directions of the first rail and the second rail along the plane substantially parallel to the main surface of the base substrate;
wherein forming the wall layer further comprises forming a third wall connecting the first rail and the second rail; and the third wall is formed to be in direct contact with the base substrate.

16. The method of claim 15, wherein forming the wall layer comprises sputtering a wall layer material on a base substrate having the first rail and the second rail formed thereon.

17. The method of claim 16, further comprising controlling a dimension and shape of the micro-channel by controlling a duration or a power of sputtering the wall layer material.

18. A method of fabricating a sensor chip, comprising:
forming a micro-channel structure according to the method of claim 15; and
forming an electrode structure of the sensor chip on a base substrate.

* * * * *